US009624868B2

(12) United States Patent
Iwai et al.

(10) Patent No.: US 9,624,868 B2
(45) Date of Patent: Apr. 18, 2017

(54) SPARK-IGNITION DIRECT INJECTION ENGINE

(71) Applicant: Mazda Motor Corporation, Aki-gun, Hiroshima (JP)

(72) Inventors: Kouhei Iwai, Hiroshima (JP); Junichi Taga, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 534 days.

(21) Appl. No.: 13/972,606

(22) Filed: Aug. 21, 2013

(65) Prior Publication Data

US 2014/0074378 A1    Mar. 13, 2014

(30) Foreign Application Priority Data

Sep. 7, 2012   (JP) .................................. 2012-197397

(51) Int. Cl.
*F02D 43/04*    (2006.01)
*F02D 41/00*    (2006.01)
(Continued)

(52) U.S. Cl.
CPC ........... *F02D 43/04* (2013.01); *F02D 41/006* (2013.01); *F02D 41/123* (2013.01);
(Continued)

(58) Field of Classification Search
CPC .... F02D 43/04; F02D 41/3035; F02D 41/123; F02D 41/006; F02D 41/401;
(Continued)

(56) References Cited

U.S. PATENT DOCUMENTS 6,000,374 A     12/1999  Cosma et al.
6,307,277 B1 *  10/2001  Tamai et al. ................ 290/40 C
(Continued)

FOREIGN PATENT DOCUMENTS

DE           60024545 T2    6/2006
DE         102012002315 A1    8/2012
(Continued)

OTHER PUBLICATIONS

German Patent and Trademark Office, Office Action Issued in German Patent Application No. 102013014430.2, Nov. 25, 2014, 8 pages.
(Continued)

*Primary Examiner* — Joseph Dallo
(74) *Attorney, Agent, or Firm* — Alleman Hall McCoy Russell & Tuttle LLP

(57) ABSTRACT

A spark-ignition direct injection engine is provided. The engine includes an engine body having a cylinder, intake and exhaust valves for opening and closing intake and exhaust ports that open to the cylinder, respectively, a fuel injection valve for injecting fuel into the cylinder, a catalyst in an exhaust passage, and a controller for operating the engine body by controlling the intake and exhaust valves and the fuel injection valve. The controller performs a fuel cut by suspending the fuel injection during engine deceleration in a non-operated accelerator state, and when the engine speed drops to a predetermined speed, the controller resumes the fuel injection. During the fuel cut, the controller opens the exhaust valve on an intake stroke and then opens the intake valve, and after closing the exhaust valve and when mixture gas is blown back to the intake port, the controller closes the intake valve.

13 Claims, 10 Drawing Sheets

(51) Int. Cl.
*F02D 41/12* (2006.01)
*F02D 41/30* (2006.01)
*F02D 41/40* (2006.01)

(52) U.S. Cl.
CPC ....... *F02D 41/3035* (2013.01); *F02D 41/401* (2013.01); *F02D 41/126* (2013.01); *F02D 2041/001* (2013.01); *F02D 2250/31* (2013.01); *Y02T 10/44* (2013.01); *Y02T 10/47* (2013.01)

(58) Field of Classification Search
CPC ........... F02D 2250/31; F02D 2041/001; F02D 41/126; Y02T 10/44; Y02T 10/47
USPC ................ 123/198 D, 198 DB, 90.15, 90.16, 123/478–494
See application file for complete search history.

(56) References Cited

U.S. PATENT DOCUMENTS

| | | | |
|---|---|---|---|
| 7,121,233 | B2 | 10/2006 | Kitamura et al. |
| 7,349,791 | B2 * | 3/2008 | Nishikiori et al. ............ 701/108 |
| 2003/0056751 | A1 | 3/2003 | Sukegawa et al. |
| 2004/0189248 | A1 * | 9/2004 | Boskovitch et al. ......... 320/116 |
| 2004/0231617 | A1 * | 11/2004 | Kitamura et al. .......... 123/27 R |
| 2006/0243241 | A1 * | 11/2006 | Kuo et al. ..................... 123/295 |
| 2008/0041339 | A1 * | 2/2008 | Nishikiori et al. ...... 123/406.48 |
| 2009/0120390 | A1 * | 5/2009 | Ezaki et al. ................ 123/90.15 |
| 2009/0138180 | A1 * | 5/2009 | Bauer et al. .................... 701/104 |
| 2010/0077989 | A1 * | 4/2010 | Yamakawa et al. .......... 123/299 |
| 2011/0259308 | A1 * | 10/2011 | Kato .............................. 123/690 |

FOREIGN PATENT DOCUMENTS

| | | | | |
|---|---|---|---|---|
| EP | 0874135 | B1 | 8/2004 | |
| EP | 1790843 | A1 * | 5/2007 | ............ F02D 21/08 |
| GB | 2343485 | A | 5/2000 | |
| JP | 2005016407 | A | 1/2005 | |
| JP | 2006233921 | A | 9/2006 | |
| JP | 2007154859 | A | 6/2007 | |
| JP | 2004316544 | A | 11/2007 | |
| JP | 2008064114 | A | 3/2008 | |
| JP | 2009197740 | A | 9/2009 | |
| JP | 2010037948 | A | 2/2010 | |
| JP | 2010236466 | A | 10/2010 | |
| JP | 2010236477 | A | 10/2010 | |
| WO | WO 2006030876 | A1 * | 3/2006 | |

OTHER PUBLICATIONS

German Patent and Trademark Office, Office Action Issued in Patent Application No. 102013013527.3, Dec. 3, 2015, 17 pages.

* cited by examiner

SPARK-IGNITION DIRECT INJECTION ENGINE

BACKGROUND

The present invention relates to a spark-ignition direct injection engine.

Arts that achieve both improvements in exhaust emission performance and thermal efficiency have been known, for example, U.S. Pat. No. 7,121,233B2 (JP2004-316544A) discloses an engine having a combustion mode of igniting mixture gas inside a cylinder by compression. For such compression-ignition combustion, it is required to increase the in-cylinder temperature so as to increase ignitability and stability.

However, with engines performing a fuel cut in deceleration, there have been cases where the in-cylinder temperature decreases during the fuel cut, and when the fuel supply is resumed, the in-cylinder temperature has lowered to the extent where compression ignition is difficult to perform.

Thus, with the engine disclosed in U.S. Pat. No. 7,121,233B2 (JP2004-316544A), when resuming from the fuel cut, spark-ignition combustion for increasing the in-cylinder temperature is performed before the compression-ignition combustion.

Moreover, an in-cylinder temperature decrease due to a fuel cut causes a disadvantage also in view of activating a catalyst.

In this regard, with the method using the engine disclosed in U.S. Pat. No. 7,121,233B2 (JP2004-316544A), the in-cylinder temperature can be increased promptly when resuming from the fuel cut; however, the in-cylinder temperature still decreases once due to the fuel cut. As a result, the temperature of the catalyst also decreases once.

SUMMARY

The present invention is made in view of the above situations and suppresses a temperature decrease of a catalyst due to a fuel cut.

The present invention is made in view of the above situations and provides a spark-ignition direct injection engine. The engine includes an engine body having a cylinder, an intake valve for opening and closing an intake port that opens to the cylinder, an exhaust valve for opening and closing an exhaust port that opens to the cylinder, a fuel injection valve for injecting fuel into the cylinder, a catalyst provided in an exhaust passage, and a controller for operating the engine body by controlling at least the intake and exhaust valves and the fuel injection valve. The controller performs a fuel cut by suspending the fuel injection from the fuel injection valve during deceleration of the engine body in a non-operated accelerator state, and when the speed of the engine body drops to a predetermined speed, the controller resumes the fuel injection from the fuel injection valve. During the fuel cut, the controller opens the exhaust valve on an intake stroke and then opens the intake valve, and at a timing after closing the exhaust valve and when mixture gas is blown back to the intake port, the controller closes the intake valve.

According to this configuration, during the deceleration of the engine body in the non-operated accelerator state, when the engine speed drops to the predetermined speed, the controller resumes the fuel injection. During the fuel cut, the controller opens the intake valve after the exhaust valve is opened, and furthermore, the controller closes the intake valve after the exhaust valve is closed. Therefore, the intake amount of fresh air into the cylinder is reduced, and a part of the gas inside the cylinder is blown back to the intake port. Thus, the amount of fresh air trapped inside the cylinder can be reduced. In this manner, the fresh air to be discharged to the exhaust port on the following exhaust stroke can be reduced, and the amount of fresh air reaching the catalyst can be reduced. As a result, the temperature decrease of the catalyst during the fuel cut can be suppressed.

Moreover, during the fuel cut, in addition to the late intake closing control, an internal EGR is performed by an exhaust open-twice control. Since the combustion is not performed during the fuel cut, the temperature inside the cylinder 18 tends to decrease; however, by introducing exhaust gas into the cylinder, the temperature decrease inside the cylinder immediately after the fuel cut can be suppressed. As a result, the mixture gas to be discharged to the exhaust port includes the EGR gas and, thus, has a higher temperature compared to when only including fresh air. This is also effective in suppressing the temperature decrease of the catalyst. Further, in the exhaust open-twice control, by opening the exhaust valve before opening the intake valve on an intake stroke, the exhaust gas can be introduced into the cylinder beforehand on the intake stroke, and as a result, a larger amount of exhaust gas can be introduced into the cylinder.

Moreover, since the mixture gas including the exhaust gas is blown back to the intake port, the gas introduced from the intake port into the cylinder on the intake stroke also includes the exhaust gas. The temperature of this gas is higher compared to when only including fresh air. This is also effective in suppressing the temperature decrease of the catalyst.

Further, as described above, suppressing the temperature decrease inside the cylinder during fuel cut by performing the EGR and the late intake closing control is advantageous in improving an ignitability when resuming the fuel injection.

At least when an operating state of the engine body is within a predetermined low engine load range, the controller may operate the engine body by performing a compression-ignition combustion where the mixture gas inside the cylinder combusts by a self-ignition. Here, the "low engine load range" may be a low load range when the operating range is divided into three ranges of low load, middle load, and high load.

When the fuel cut is performed, the engine load decreases rapidly. Therefore, when resuming the fuel injection, normally, the operating state of the engine is within the predetermined low engine load range. In other words, when resuming the engine after the fuel cut, the operating state of the engine is within the predetermined low engine load range in many cases, and the compression-ignition combustion is performed within the low engine load range. The low temperature in the cylinder is a disadvantage in view of appropriately performing the compression-ignition combustion, and the temperature decrease inside the cylinder during the fuel cut needs to be suppressed. According to the above configuration, the temperature decrease inside the cylinder during the fuel cut is suppressed by performing the EGR and the late intake closing control. In other words, the EGR and the late intake closing control are not only advantageous in suppressing the temperature decrease of the catalyst, but are also advantageous in view of the ignitability of the compression-ignition combustion.

At least when an operating state of the engine body is within a predetermined high engine load range, the controller may set an air excess ratio to 1:1 or below to operate the engine body. Here, the "high engine load range" may be the high load range when the operating range is divided into three ranges of low load, middle load, and high load.

According to this configuration, since air excess ratio is set to 1:1 or below within the predetermined high engine load range, the temperature of the combusted gas is high. Therefore, when performing the fuel cut in a state where the operating state of the engine body is within the predetermined high load range, because the temperature of the burned gas is high, it is effective in suppressing the temperature decrease inside the cylinder as described above.

The controller may advance a close timing of the intake valve when resuming the fuel injection.

As described before, by the late intake closing control, the fresh air amount inside the cylinder is decreased. Thus, in resuming the combustion, by advancing the close timing of the intake valve, the fresh air amount can be secured.

The engine may also include a deceleration regenerative system for regenerating a motional energy during deceleration.

According to this configuration, since the late intake closing control is performed during the fuel cut, the pumping loss is reduced. As a result, a larger amount of energy can be regenerated by the deceleration regenerative system. Note that, during the fuel cut, it is preferable to fully open the throttle valve in addition to the late intake closing control, in view of regenerating a larger amount of energy.

DETAILED DESCRIPTION OF EMBODIMENTS

Figure 1:
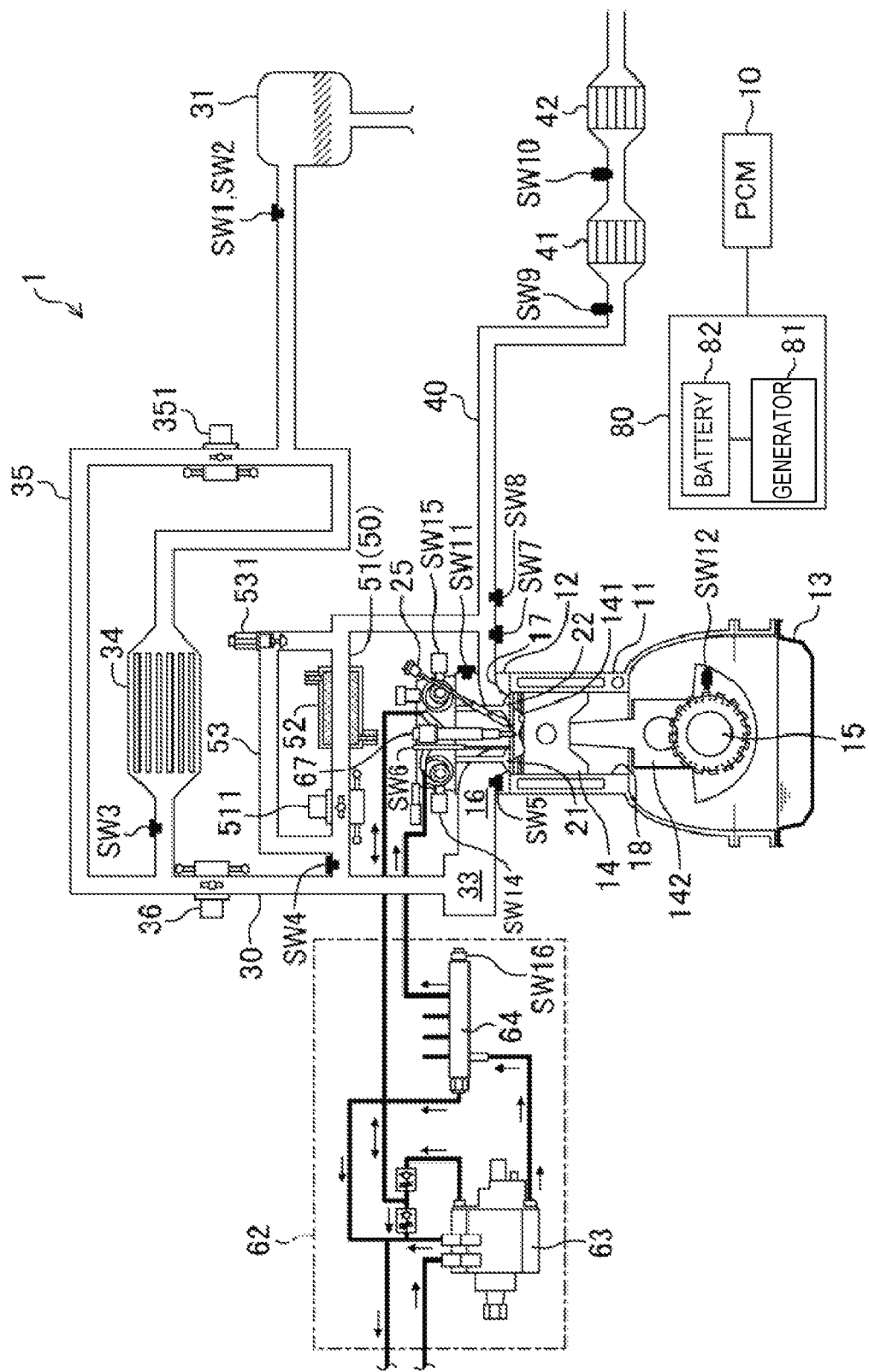
FIG. 1 is a schematic diagram showing a configuration of a spark-ignition direct injection engine.
Figure 2:
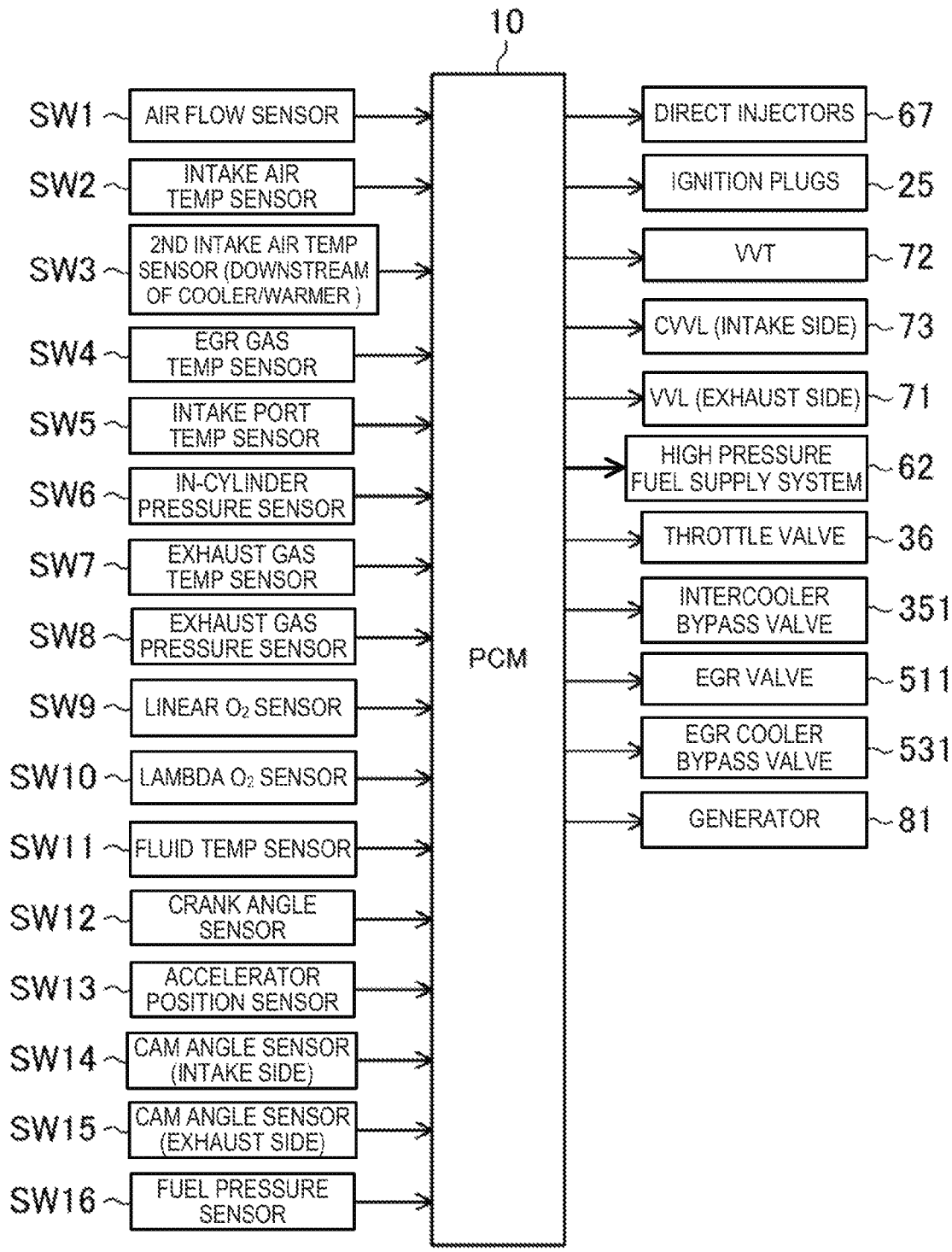
FIG. 2 is a block diagram according to a control of the spark-ignition direct injection engine.
Figure 3:
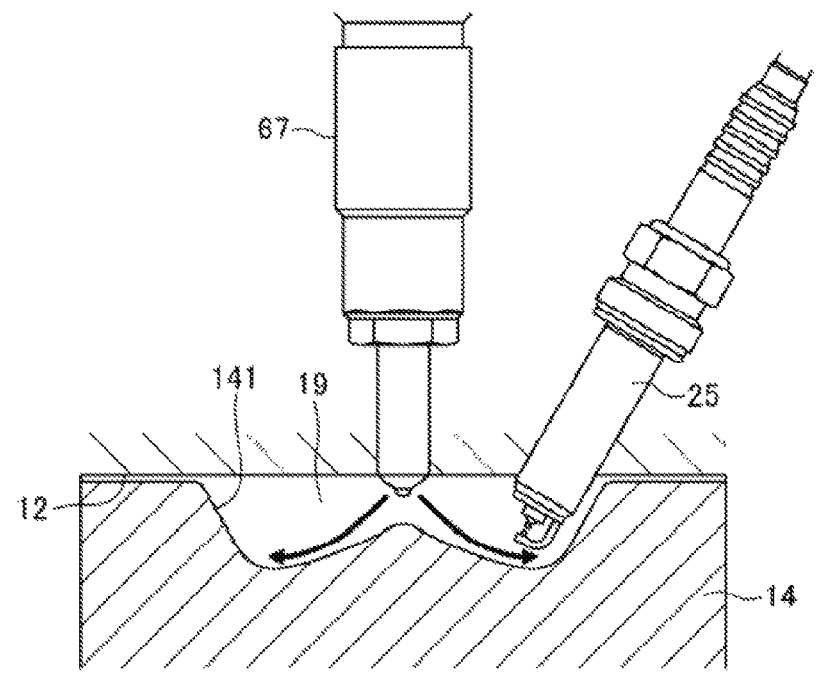
FIG. 3 is an enlarged cross-sectional view showing a combustion chamber.

Hereinafter, a spark-ignition direct injection engine according to embodiments of the present invention is described in detail with reference to the appended drawings. The following description of the preferred embodiments is an illustration. FIGS. 1 and 2 show a schematic configuration of an engine 1 (engine body) of this embodiment. The engine 1 is a spark-ignition gasoline engine that is equipped in a vehicle and supplied with fuel containing at least gasoline. The engine 1 includes a cylinder block 11 provided with a plurality of cylinders 18 (note that, although only one cylinder is illustrated in FIG. 1, here, four cylinders are linearly provided, for example), a cylinder head 12 arranged on the cylinder block 11, and an oil pan 13 arranged below the cylinder block 11 and where a lubricant is stored. Inside the cylinders 18, reciprocating pistons 14 coupled to a crankshaft 15 via connecting rods 142, respectively, are fitted. As shown in FIG. 3 in an enlarged manner, a cavity 141 having a reentrant shape such as the one used in a diesel engine, is formed on a top face of each piston 14. When the piston 14 is at a position near a compression top dead center (CTDC), the cavity 141 faces toward an injector 67 described later. The cylinder head 12, the cylinders 18, and the pistons 14 each formed with the cavity 141 partition combustion chambers 19. Note that, the shape of the combustion chamber 19 is not limited to the shape in the illustration. For example, the shape of the cavity 141, the shape of the top face of the piston 14, and the shape of a ceiling part of the combustion chamber 19 may suitably be changed.

A geometric compression ratio of the engine 1 is set comparatively high to be 15:1 or above so as to improve a theoretical thermal efficiency and stabilize compression-ignition combustion (described later). Note that, the geometric compression ratio may suitably be set within a range of 15:1 to about 20:1.

In the cylinder head 12, an intake port 16 and an exhaust port 17 are formed, and an intake valve 21 for opening and closing the opening of the intake port 16 on the combustion chamber 19 side and an exhaust valve 22 for opening and closing the opening of the exhaust port 17 on the combustion chamber 19 side are arranged for each of the cylinders 18.

In a valve train system of the engine 1 for operating the intake and exhaust valves 21 and 22, a mechanism such as a hydraulically-actuated variable valve mechanism 71 (see FIG. 2, hereinafter, may be referred to as the VVL (Variable Valve Lift)) for switching an operation mode of the exhaust valve 22 between a normal mode and a special mode is provided on an exhaust side. The VVL 71 (the detailed configuration is not illustrated) is configured to include two kinds of cams with different cam profiles from each other in which a first cam has one cam nose and a second cam has two cam noses; and a lost motion mechanism for selectively transmitting an operation state of either one of the first and second cams to the exhaust valve 22. When the lost motion mechanism transmits the operation state of the first cam to the exhaust valve 22, the exhaust valve 22 operates in the normal mode where it opens only once during an exhaust stroke. On the other hand, when the lost motion mechanism transmits the operation state of the second cam to the exhaust valve 22, the exhaust valve 22 operates in the special mode where it opens once during the exhaust stroke and once more during an intake stroke, which is a so called exhaust open-twice control. The normal and special modes of the VVL 71 are switched therebetween according to an operating state of the engine. Specifically, the special mode is utilized for a control related to an internal EGR. In other words, the exhaust valves 22 and the VVL 71 configure one of exhaust gas recirculation (EGR) mechanisms, such as a first EGR mechanism. Moreover, the VVL 71 configures a valve train mechanism.

Hereinafter, the processing of operating the VVL 71 in the normal mode so as not to perform the exhaust open-twice control may be referred to as "turning the VVL 71 off," and the processing of operating the VVL 71 in the special mode so as to perform the exhaust open-twice control may be referred to as "turning the VVL 71 on." Note that, an electromagnetically-operated valve system for operating the exhaust valve 22 by using an electromagnetic actuator may be adopted for switching between the normal and special modes. Further, the execution of the internal EGR is not limited to the exhaust open-twice control, and it may be achieved through, for example, an internal EGR control by an intake open-twice control or through an internal EGR control where burned gas is left in the cylinder 18 by setting a negative overlap period where both of the intake and exhaust valves 21 and 22 are closed during the exhaust stroke or the intake stroke.

While the valve train system on the exhaust side is provided with the VVL 71, as shown in FIG. 2, a phase variable mechanism 72 (hereinafter, may be referred as the VVT (Variable Valve Timing)) for changing a rotational phase of an intake camshaft with respect to the crankshaft 15 and a lift variable mechanism 73 (hereinafter, may be referred as the CVVL (Continuously Variable Valve Lift) for continuously changing a lift of the intake valve 21 are provided on an intake side of the valve train system. A well-known hydraulic, electromagnetic or mechanical structure may suitably be adopted for the VVT 72 (a detailed structure is not illustrated). Further, various kinds of well-known structure may suitably be adopted for the CVVL 73 (a detailed structure is not illustrated). Open and close timings and the lift of the intake valve 21 can be changed by the VVT 72 and the CVVL 73, respectively.

For each cylinder 18, the injector 67 for directly injecting the fuel into the cylinder 18 is attached to the cylinder head 12. As shown in an enlarged manner in FIG. 3, a nozzle hole of the injector 67 is arranged in a center part of the ceiling face of the combustion chamber 19 to be oriented toward inside the combustion chamber 19. The injector 67 directly injects the fuel into the combustion chamber 19 by an amount according to the operating state of the engine 1 at an injection timing set according to the operating state of the engine 1. In this embodiment, the injector 67 (a detailed configuration is not illustrated) is a multi hole injector formed with a plurality of nozzle holes. Thus, the injector 67 injects the fuel so that the fuel spray spreads radially from the central position of the combustion chamber 19. The injector 67 configures a fuel injection valve.

As indicated by the arrows in FIG. 3, at a timing corresponding to the piston 14 reaching the position near the CTDC, the fuel spray injected to spread radially from the center part of the combustion chamber 19 flows along a wall surface of the cavity 141 formed on the piston top face. Therefore, it may be said that the cavity 141 is formed to contain therewithin the fuel spray injected at the timing corresponding to the piston 14 reaching the position near the CTDC. The combination of the multi hole injector 67 and the cavity 141 is advantageous in, after the fuel is injected, shortening a mixture gas forming period and the combustion period. Note that, the injector 67 is not limited to the multi hole injector, and may be an outward opening valve type injector.

A fuel supply path is coupled between a fuel tank (not illustrated) and the injectors 67. A fuel supply system 62 having a fuel pump 63 and a common rail 64 and for supplying the fuel to each of the injectors 67 at a relatively high fuel pressure is provided within the fuel supply path. The fuel pump 63 pumps the fuel from the fuel tank to the common rail 64, and the common rail 64 can accumulate the pumped fuel at a comparatively high fuel pressure. By opening the nozzle holes of the injector 67, the fuel accumulated in the common rail 64 is injected from the nozzle holes of the injector 67. Here, the fuel pump 63 is a plunger type pump (not illustrated) and is operated by the engine 1. The fuel supply system 62 including the engine-operated pump enables the supply of fuel to the injector 67 at a high fuel pressure of 30 MPa or above. The fuel pressure may be set about 120 MPa at the maximum. As described later, the pressure of the fuel to be supplied to the injector 67 is changed according to the operating state of the engine 1. Note that, the fuel supply system 62 is not limited to the above configuration.

Further, in the cylinder head 12, as shown in FIG. 3, an ignition plug 25 for igniting mixture gas inside the combustion chamber 19 is attached for each cylinder 18. In this embodiment, the ignition plug 25 is attached penetrating the cylinder head 12 so as to extend obliquely downward from the exhaust side of the engine 1. As shown in FIG. 3, a tip of the ignition plug 25 is oriented toward inside the cavity of the piston 14 at the CTDC.

On one side surface of the engine 1, as shown in FIG. 1, an intake passage 30 is connected to communicate with each of the intake ports 16 of the cylinders 18. On the other side of the engine 1, an exhaust passage 40 is connected to lead out the burned gas (exhaust gas) discharged from each of the combustion chambers 19 of the cylinders 18.

An air cleaner 31 for filtrating intake air is arranged in an upstream end part of the intake passage 30. A surge tank 33 is arranged near a downstream end of the intake passage 30. A part of the intake passage 30 downstream of the surge tank 33 is branched to be independent passages extending toward the respective cylinders 18, and downstream ends of the independent passages are connected with the intake ports 16 of the cylinders 18, respectively.

A water-cooled type intercooler/warmer 34 for cooling or heating air and a throttle valve 36 for adjusting an intake air amount to each cylinder 18 are arranged between the air cleaner 31 and the surge tank 33 in the intake passage 30. Further, an intercooler/warmer bypass passage 35 for bypassing the intercooler/warmer 34 is connected within the intake passage 30, and an intercooler/warmer bypass valve 351 for adjusting an air flow rate passing through the passage 35 is arranged within the intercooler/warmer bypass passage 35. A ratio of a flow rate of the intercooler/warmer bypass passage 35 and a flow rate of the intercooler/warmer 34 are adjusted through adjusting an opening of the intercooler/warmer bypass valve 351, and thus, a temperature of fresh air to be introduced into the cylinder 18 can be adjusted.

An upstream part of the exhaust passage 40 is constituted with an exhaust manifold having independent passages branched toward the respective cylinders 18 and connected with respective external ends of the exhaust ports 17, and a manifold section where the independent passages merge together. In a part of the exhaust passage 40 on the downstream side of the exhaust manifold, a direct catalyst 41 and an underfoot catalyst 42 are connected as an exhaust emission control system for purifying hazardous components contained in the exhaust gas. Each of the direct catalyst 41 and the underfoot catalyst 42 includes a cylinder case and, for example, a three-way catalyst arranged in a flow passage within the case. The direct catalyst 41 and the underfoot catalyst 42 configure the catalyst.

A part of the intake passage 30 between the surge tank 33 and the throttle valve 36 is connected with a part of the exhaust passage 40 on the upstream side of the direct catalyst 41 via an EGR passage 50 for recirculating a part of the exhaust gas (EGR gas) to the intake passage 30. The EGR passage 50 includes a main passage 51 arranged with an EGR cooler 52 for cooling the exhaust gas by an engine coolant, and an EGR cooler bypass passage 53 for bypassing the EGR cooler 52. An EGR valve 511 for adjusting a recirculation amount of the exhaust gas to the intake passage 30 is arranged within the main passage 51. An EGR cooler bypass valve 531 for adjusting a flow rate of the exhaust gas flowing through the EGR cooler bypass passage 53 is arranged within the EGR cooler bypass passage 53. These EGR passage 50, the main passage 51, the EGR valve 511, the EGR cooler 52, the EGR cooler bypass passage 53, and the EGR cooler bypass valve 531 configure one of the EGR mechanisms, such as a second EGR mechanism.

Moreover, the engine 1 includes a deceleration regenerative system 80. The deceleration regenerative system 80 includes a generator 81 (alternator) for being operated by the engine 1 to generate a power, and a battery 82 connected with the generator 81. The generator 81 is rotated by the crankshaft of the engine 1 via a belt during the operation of the engine 1. Note that, the generator 81 is configured to be switchable of its state between a generating state of being operated by the engine 1 to generate the power, and a non-generating state of being operated by the engine 1 but not generating the power. The generated power of the generator 81 may be accumulated in the battery 82 or supplied to a vehicle electrical load (not illustrated). Note that, the battery 82 may be replaced with a power accumulating device, such as a capacitor.

The diesel engine 1 with the configuration described as above is controlled by a powertrain control module 10 (hereinafter, may be referred to as the PCM). The PCM 10 is configured with a CPU, a memory, a counter timer group, an interface, and a microprocessor with paths for connecting these units. The PCM 10 configures the controller.

As shown in FIGS. 1 and 2, detection signals of various kinds of sensors SW1 to SW16 are inputted to the PCM 10. The various kinds of sensors include the following sensors: an air flow sensor SW1 for detecting the flow rate of the fresh air and an intake air temperature sensor SW2 for detecting the temperature of the fresh air that are arranged on the downstream side of the air cleaner 31; a second intake air temperature sensor SW3 arranged on the downstream side of the intercooler/warmer 34 and for detecting the temperature of the fresh air after passing through the intercooler/warmer 34; an EGR gas temperature sensor SW4 arranged near a connecting part of the EGR passage 50 with the intake passage 30 and for detecting the temperature of external EGR gas; an intake port temperature sensor SW5 attached to the intake port 16 and for detecting the temperature of the intake air immediately before flowing into the cylinder 18; an in-cylinder pressure sensor SW6 attached to the cylinder head 12 and for detecting the pressure inside the cylinder 18; an exhaust gas temperature sensor SW7 and an exhaust gas pressure sensor SW8 arranged near a connecting part of the exhaust passage 40 with the EGR passage 50 and for detecting the exhaust gas temperature and pressure, respectively; a linear $O_2$ sensor SW9 arranged on the upstream side of the direct catalyst 41 and for detecting an oxygen concentration within the exhaust gas; a lambda $O_2$ sensor SW10 arranged between the direct catalyst 41 and the underfoot catalyst 42 and for detecting an oxygen concentration within the exhaust gas; a fluid temperature sensor SW11 for detecting a temperature of the engine coolant; a crank angle sensor SW12 for detecting a rotational angle of the crankshaft 15; an accelerator position sensor SW13 for detecting an accelerator opening corresponding to an angle of an acceleration pedal (not illustrated) of the vehicle; an intake cam angle sensor SW14 and an exhaust cam angle sensor SW 15; and a fuel pressure sensor SW16 attached to the common rail 64 of the fuel supply system 62 and for detecting the fuel pressure to be supplied to the injector 67.

By performing various kinds of operations based on these detection signals, the PCM 10 determines the state of the engine 1, and further the vehicle, and outputs control signals to the injectors 67, the ignition plugs 25, the VVT 72 and CVVL 73 on the intake valve side, the VVL 71 on the exhaust valve side, the fuel supply system 62, the generator 81, and the actuators of the various kinds of valves (throttle valve 36, intercooler/warmer bypass valve 351, the EGR valve 511, and the EGR cooler bypass valve 531) according to the determined state. In this manner, the PCM 10 operates the engine 1.

Figure 4:
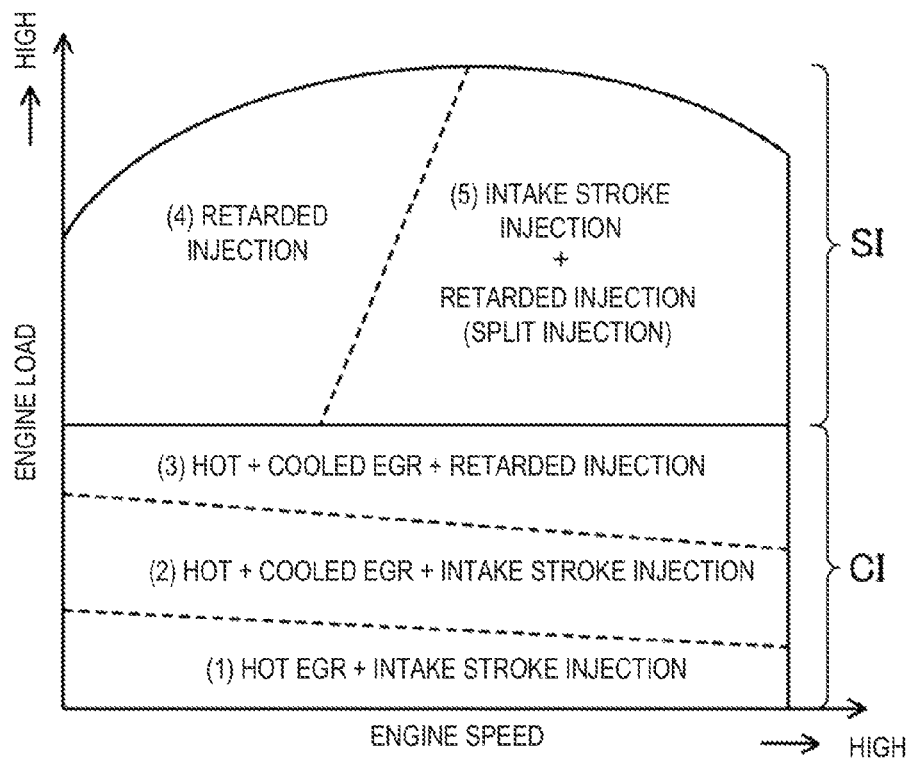
FIG. 4 is a chart exemplifying an operating range of the engine.

FIG. 4 shows one example of operating ranges of the engine 1. Within a low engine load range where an engine load is relatively low, the engine 1 does not perform an ignition by the ignition plug 25 and performs compression-ignition combustion in which combustion is generated by a compression self-ignition, so as to improve fuel consumption and exhaust emission performance. However, with the compression-ignition combustion, the speed of the combustion becomes excessively rapid as the engine load increases and thus, causes a problem of a combustion noise, etc. Therefore, with the engine 1, within a high engine load range where the engine load is relatively high, the compression-ignition combustion is suspended and is switched to spark-ignition combustion using the ignition plug 25. As above, the engine 1 is configured to switch a combustion mode according to the operating state of the engine, particularly the load of the engine 1, between a CI (Compression-Ignition) mode where the compression-ignition combustion is performed and an SI (Spark-Ignition) mode where the spark-ignition combustion is performed. Note that, the boundary line of switching the mode is not limited to the example in the illustration.

Figure 5A:
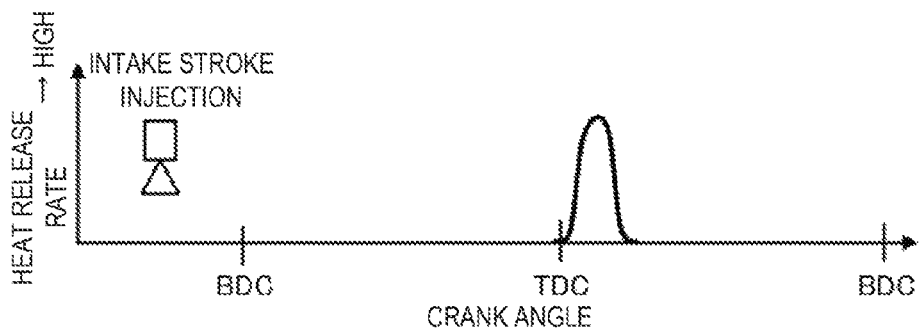
FIG. 5A shows one example of a fuel injection timing in a case where an intake stroke injection is performed in a CI mode and a heat release rate of a CI combustion caused thereby.

The CI mode is divided into three ranges according to levels of the engine load. Specifically, within a range (1) with the lowest engine load in the CI mode, EGR gas at relatively high temperature (hereinafter, may be referred to as the "hot EGR gas") is introduced into the cylinder 18 to improve the ignitability and stability of the compression-ignition combustion. This is achieved by turning the VVL 71 on and performing the exhaust open-twice control of opening the exhaust valve 22 during the intake stroke. The introduction of the hot EGR gas increases the temperature at the end of compression stroke, and is advantageous in improving the ignitability and stability of the compression-ignition combustion within the range (1) with low engine load. Moreover, within the range (1), as shown in FIG. 5A, the injector 67 injects the fuel into the cylinder 18 at least in a period between the intake stroke and the middle stage of the compression stroke, and thus homogeneous lean mixture gas is formed. An air excess ratio λ of the mixture gas may be set to, for example, 2.4:1 or higher to enable suppressed generation of RawNOx and improve the exhaust emission performance. Thus, as shown in FIG. 5A, the lean mixture gas is compressed to self-ignite near the CTDC.

Although it will be described later in detail, in a part of the range (1) with higher engine load than other parts, specifically, the part including the boundary between the range (1) and a range (2), even though the fuel is injected into the cylinder 18 at least in the period between the intake stroke and the middle stage of the compression stroke, the air-fuel ratio of the mixture gas is set to a theoretical air-fuel ratio (λ≈1). The setting to the theoretical air-fuel ratio enables use of a three-way catalyst, simplifies the control when switching between the SI and CI modes is simplified, and further, contributes in expanding the CI mode applicable range to the high load range side.

In the CI mode, within the range (2) with higher engine load than the range (1), similar to the higher engine load part of the range (1), the fuel is injected into the cylinder 18 at least in the period between the intake stroke and the middle stage of the compression stroke (see FIG. 5A), and the homogeneous mixture gas at the theoretical air-fuel ratio (λ≈1) is formed.

Moreover, within the range (2), since the temperature inside the cylinder 18 naturally increases according to the increase of the engine load, the hot EGR gas amount is reduced to avoid pre-ignition. This reduction is achieved by adjusting the internal EGR gas amount to be introduced into the cylinder 18.

Furthermore, within the range (2), EGR gas at relatively low temperature (hereinafter, may be referred to as the "cooled EGR gas") is introduced into the cylinder 18. Thus, by introducing the hot EGR gas at a high temperature and the cooled EGR gas at a low temperature into the cylinder 18 at a suitable ratio, the temperature inside the cylinder 18 at the end of the compression stroke is adjusted appropriately, a rapid combustion is avoided while securing the ignitability of the compression ignition, and the compression-ignition combustion is stabilized. Note that, an EGR ratio (a ratio of the total EGR gas of the hot EGR gas and the cooled EGR gas to be introduced into the cylinder 18) is set as high as possible under the condition that the air excess ratio of the mixture gas is set to achieve λ≈1. Therefore, within the range (2), the fuel injection amount increases as the engine load increases, and thus, the EGR ratio gradually reduces.

Figure 5B:
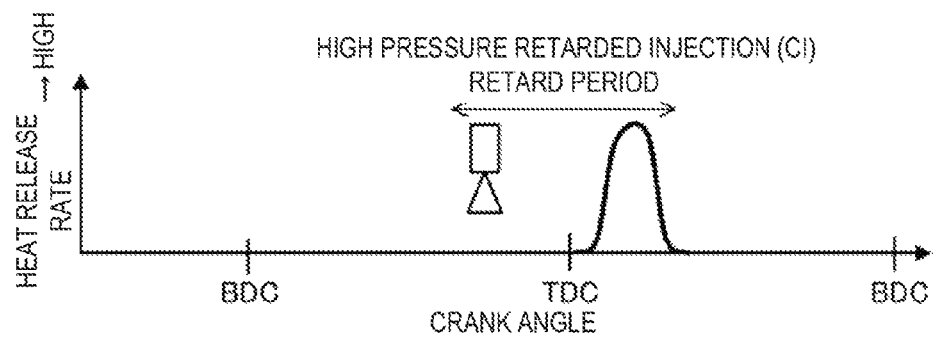
FIG. 5B shows one example of a fuel injection timing in a case where a high pressure retarded injection is performed in the CI mode, and a heat release rate of the CI combustion caused thereby.

Within a range (3) with the highest engine load in the CI mode which includes a switching boundary between the CI mode and the SI mode, if the fuel is injected into the cylinder 18 in the period between the intake stroke and the middle stage of the compression stroke, it causes abnormal combustion such as pre-ignition. On the other hand, if a large amount of cooled EGR gas is introduced to reduce the in-cylinder temperature at the end of the compression stroke, then the ignitability of the compression ignition will degrade. In other words, since the compression-ignition combustion cannot be performed stably only by controlling the temperature inside the cylinder 18, within the range (3), by devising the fuel injection mode in addition to the temperature control of the cylinder 18, the compression-ignition combustion can be stabilized while avoiding the abnormal combustion, such as pre-ignition. Specifically, in the fuel injection mode, as shown in FIG. 5B, the fuel is injected into the cylinder 18 at least in a period between the late stage of the compression stroke and the early stage of the expansion stroke (hereinafter, the period is referred to as the retard period) at a significantly higher fuel pressure compared to the conventional mode. Hereinafter, this characteristic fuel injection mode is referred to as the "high pressure retarded injection" or simply "retarded injection." By the high pressure retarded injection, the compression-ignition combustion can be stabilized while avoiding the abnormal combustion within the range (3). The details of the high pressure retarded injection will be described later.

Within the range (3), the hot EGR gas and the cooled EGR gas are introduced into the cylinder at a suitable ratio similarly to the range (2). Thus, the temperature inside the cylinder 18 at the end of the compression stroke is adjusted appropriately and the compression-ignition combustion is stabilized.

While the CI mode has three divided ranges according to the engine load, the SI mode is divided into two ranges (4) and (5) according to the engine speed. When the operating range of the engine 1 is divided into two higher and lower speed ranges, in FIG. 4, the range (4) corresponds to the lower engine speed range and the range (5) corresponds to the higher engine speed range. Although in the operating ranges shown in FIG. 4, the boundary between the ranges (4) and (5) extending with respect to the engine load is inclined in the engine speed direction, the boundary is not limited to the illustrated example.

In each of the ranges (4) and (5), the mixture gas is set to the theoretical air-fuel ratio (λ≈1 or λ≤1) similar to the ranges (2) and (3). Therefore, the air-fuel ratio of the mixture gas is fixed at the theoretical air-fuel ratio (λ≈1 or λ≤1) over the boundary between the CI mode and the SI mode, and this enables use of a three-way catalyst. Moreover, within the ranges (4) and (5), the throttle valve 36 is basically fully opened and the fresh air amount and the external EGR gas amount to be introduced into the cylinder 18 are adjusted by the opening adjustment of the EGR valve 511. Such adjustment of the ratio of gas introduced into the cylinder 18 reduces a pumping loss, and by introducing a large amount of EGR gas into the cylinder 18, the combustion temperature of the spark-ignition combustion is suppressed low to reduce a cooling loss. Within the ranges (4) and (5), the external EGR gas cooled mainly by passing through the EGR cooler 52 is introduced into the cylinder 18. Thus, it becomes advantageous to avoid the abnormal combustion as well as to suppress the generation of RawNOx. The openings of the EGR valve 511 and the EGR cooler bypass valve 531 are reduced as the engine load increases. Here, the opening of the EGR valve 511 is relatively larger than the opening of the EGR cooler bypass valve 531, in other words, the cooled EGR gas amount is larger than the hot EGR gas amount. As the engine load increases, the EGR cooler bypass valve 531 is fully closed before the EGR valve 511 is fully closed. Note that, within a full engine load range, the EGR valve 511 is fully closed to cancel the external EGR.

The geometric compression ratio of the engine 1 is, as described above, set to 15:1 or above (e.g., 18:1). Since a high compression ratio increases the in-cylinder temperature and the in-cylinder pressure at the end of the compression stroke, it is advantageous in stabilizing the compression-ignition combustion in the CI mode, especially in the low engine load range of the CI mode (e.g., the range (1)). Whereas, in the SI mode that is the high engine load range, this high compression ratio engine 1 causes a problem that the abnormal combustion (e.g., pre-ignition and knocking) easily occurs.

Figure 5C:
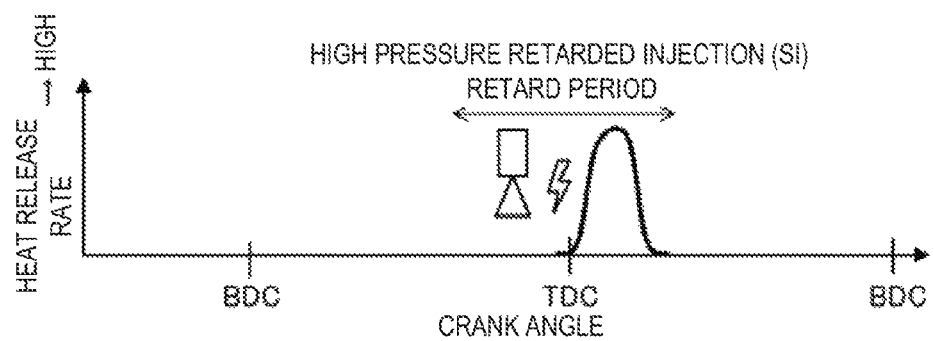
FIG. 5C shows one example of a fuel injection timing and an ignition timing in a case where the high pressure retarded injection is performed in an SI mode, and a heat release rate of the SI combustion caused thereby.
Figure 5D:
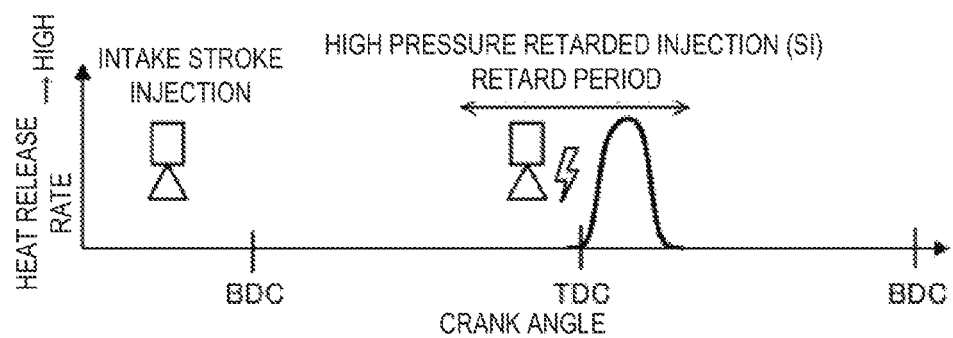
FIG. 5D shows one example of a fuel injection timing and an ignition timing in a case where the divided injections of the intake stroke injection and the high pressure retarded injection are performed in the SI mode, and a heat release rate of the SI combustion caused thereby.

Thus, with the engine 1, the high pressure retarded injection is performed within the ranges (4) and (5) of the SI mode to avoid the abnormal combustion. Specifically, within the range (4), at a high fuel pressure of 30 MPa or above, as shown in FIG. 5C, only the high pressure retarded injection is performed, in which the fuel is injected into the cylinder 18 in the retard period between the late stage of the compression stroke and the early stage of the expansion stroke. On the other hand, within the range (5), as shown in FIG. 5D, a part of the fuel for injection is injected into the cylinder 18 in an intake stroke period where the intake valve 21 is opened, and the rest of the fuel for the injection is injected into the cylinder 18 in the retard period. In other words, within the range (5), a split injection of fuel is performed. Here, the intake stroke period where the intake valve 21 is opened is a period defined based on open and close timings of the intake valve, and not a period defined based on the piston position. Here, the end of the intake stroke may vary with respect to the timing at which the piston reaches an intake bottom dead center (IBDC) depending on the close timing of the intake valve 21 which is changed by the VVT 72 and the CVVL 73.

Next, the high pressure retarded injection in the SI mode is described with reference to FIG. 6, which shows charts comparing differences in a heat release rate (upper chart) and an extent of reaction of unburned mixture gas (lower chart), between an SI combustion caused by the high pressure retarded injection described above (solid line) and the conventional SI combustion in which the fuel injection is performed during the intake stroke (broken line). The lateral axis in FIG. 6 indicates the crank angle. The comparison is performed under a condition that the operating state of the engine 1 is within the lower engine speed range with high engine load (i.e., the range (4)), and a fuel amount to be injected is the same between the SI combustion caused by the high pressure retarded injection and the conventional SI combustion.

First, for the conventional SI combustion, a predetermined amount of fuel is injected into the cylinder 18 during the intake stroke (broken line in the upper chart). After the fuel is injected, a comparatively homogeneous mixture gas is formed inside the cylinder 18 before the piston 14 reaches the CTDC. Then, in this case, the ignition is performed at a predetermined timing indicated by the first white circle after the CTDC, and thereby, the combustion starts. After the combustion starts, as indicated by the broken line in the upper chart of FIG. 6, the combustion ends after progressing through a peak of the heat release rate. A period from the start of the fuel injection until the end of the combustion corresponds to a reactable time length of unburned mixture gas (hereinafter, may simply be referred to as the reactable time length) and, as indicated by the broken line in the lower chart of FIG. 6, the reaction of the unburned mixture gas gradually progresses within the reactable time length. The dotted line in the lower chart indicates an ignition threshold (i.e., a reactivity of the unburned mixture gas being ignited). The conventional SI combustion has, in combination with being performed within the low engine speed range, an extremely long reactable time length, and the reaction of the unburned mixture gas keeps progressing for the reactable time length, and therefore, the reactivity of the unburned mixture gas exceeds the ignition threshold around the ignition timing, causing the abnormal combustion such as pre-ignition and knocking.

On the other hand, the high pressure retarded injection aims to avoid the abnormal combustion by shortening the reactable time length. As shown in FIG. 6, the reactable time length in this case is a total time length of a period where the injector 67 injects the fuel ((1) an injection period), a period from the end of the injection until combustible mixture gas is formed around the ignition plug 25 ((2) a mixture gas forming period), and a period from the start of the combustion started by the ignition, until the combustion ends ((3) a combustion period), in other words, (1)+(2)+(3). The high pressure retarded injection shortens each of the injection period, the mixture gas forming period, and the combustion period, and thereby, shortens the reactable time length. The methods of shortening the periods are explained sequentially.

First, a high fuel pressure relatively increases the fuel injection amount injected from the injector 67 per unit time. Therefore, in a case where the fuel injection amount is fixed, a relation between the fuel pressure and the injection period of the fuel substantially becomes as follows: the injection period extends as the fuel pressure decreases, and the injection period contracts as the fuel pressure increases. Therefore, the high pressure retarded injection in which the fuel pressure is set significantly higher than the conventional pressure shortens the injection period.

Further, the high fuel pressure is advantageous in atomizing the fuel spray injected into the cylinder 18 and further extends a spreading distance of the fuel spray. Therefore, a relation between the fuel pressure and a fuel vaporization time length substantially becomes as follows: the fuel vaporization time length extends as the fuel pressure decreases, and the fuel vaporization time length contracts as the fuel pressure increases. Further, a relation between the fuel pressure and a time length for the fuel spray to reach around the ignition plug 25 (the fuel spray reaching time length) substantially becomes as follows: the fuel spray reaching time length extends as the fuel pressure decreases, and the fuel spray reaching time length contracts as the fuel pressure increases. The mixture gas forming period corresponds to a total time length of the fuel vaporization time length and the fuel spray reaching time length to around the ignition plug 25; therefore, the mixture gas forming period contracts as the fuel pressure increases. Therefore, the high pressure retarded injection in which the fuel pressure is set significantly higher than the conventional pressure shortens the fuel vaporization time length and the fuel spray reaching time length to around the ignition plug 25 and, as a result, shortens the mixture gas forming period. On the other hand, as indicated by the white circle of the chart in FIG. 6, with the conventional intake stroke injection with the low fuel pressure, the mixture gas forming period is significantly longer. Note that, the combination of the multi hole injector 67 and the cavity 141 shortens the time length from the end of the fuel injection until when the fuel spray reaches around the ignition plug 25 and, as a result, becomes advantageous in shortening the mixture gas forming period.

As above, shortening the injection period and the mixture gas forming period enables the injection timing of the fuel to be retarded, more precisely, the injection start timing is retarded to a comparatively late timing. Therefore, as shown in the upper chart of FIG. 6, with the high pressure retarded injection, the fuel injection is performed within the retard period between the late stage of the compression stroke and the early stage of the expansion stroke. Although, due to injecting the fuel into the cylinder 18 at the high fuel pressure, the turbulence of flow inside the cylinder becomes stronger and a turbulence kinetic energy inside the cylinder 18 increases, the high turbulence kinetic energy is, in combination with retarding the fuel injection timing to the comparatively late timing, advantageous in shortening the combustion period.

In other words, in a case where the fuel injection is performed within the retard period, a relation between the fuel pressure and the turbulence kinetic energy within the combustion period substantially becomes as follows: the turbulence kinetic energy decreases as the fuel pressure decreases, and the turbulence kinetic energy increases as the fuel pressure increases. Here, even if the fuel is injected into the cylinder 18 at the high fuel pressure, in the case where the injection timing is during the intake stroke, due to the time length until the ignition timing being long and inside the cylinder 18 being compressed on the compression stroke after the intake stroke, the turbulence inside the cylinder 18 is subsided. As a result, in the case where the fuel injection is performed during the intake stroke, the turbulence kinetic energy within the combustion period becomes comparatively low regardless of the fuel pressure.

A relation between the turbulence kinetic energy within the combustion period and the combustion period substantially becomes as follows: the combustion period extends as the turbulence kinetic energy decreases and the combustion period contracts as the turbulence kinetic energy increases. Therefore, a relation between the fuel pressure and the combustion period becomes as follows: the combustion period extends as the fuel pressure decreases and the combustion period contracts as the fuel pressure increases. In other words, the high pressure retarded injection shortens the combustion period. On the other hand, with the conventional intake stroke injection with the low fuel pressure, the combustion period extends. Note that, the multi hole injector 67 is advantageous in increasing the turbulence kinetic energy inside the cylinder 18 and shortening the combustion period. Moreover, it is also advantageous in shortening the combustion period to keep the fuel spray contained within the cavity 141 by the combination of the multi hole injector 67 and the cavity 141.

Figure 6:
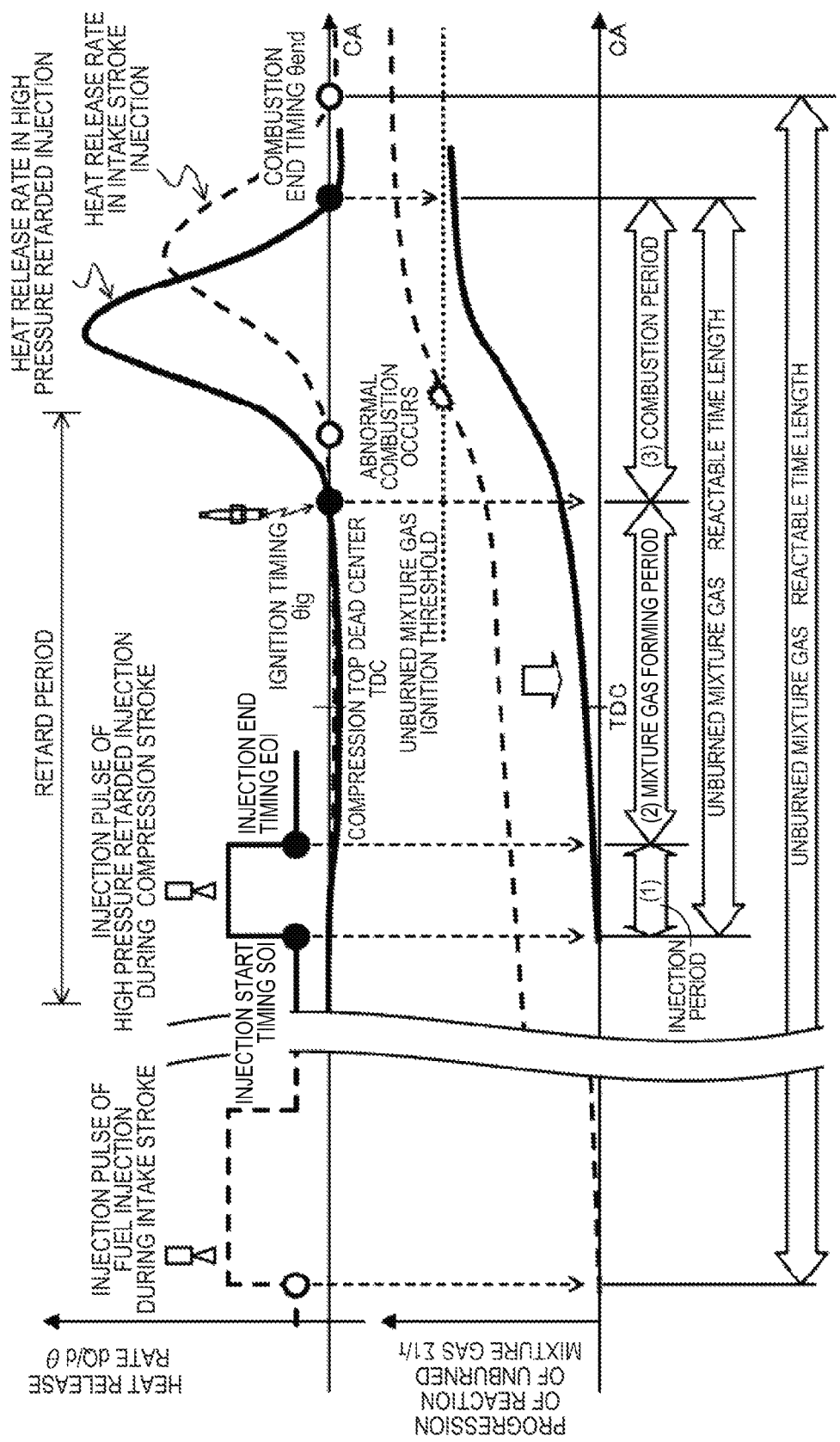
FIG. 6 is a chart comparing an SI combustion caused by the high pressure retarded injection with the conventional SI combustion.

As above, the high pressure retarded injection shortens each of the injection period, the mixture gas forming period, and the combustion period, and as a result, as shown in FIG. 6, the high pressure retarded injection can significantly shorten the reactable time length of the unburned mixture gas from a fuel injection start timing SOI to a combustion end timing θend compared to the conventional case where the fuel injection is performed during the intake stroke. As a result of shortening the reactable time length, as shown in the upper chart of FIG. 6, while the extent of reaction of the unburned mixture gas at the end of the combustion exceeds the ignition threshold and the abnormal combustion occurs with the conventional intake stroke injection with the low fuel pressure as indicated by the white circle, with the high pressure retarded injection, as indicated by the black circle, the progression of the reaction of the unburned mixture gas at the end of the combustion is suppressed and the abnormal combustion can be avoided. Note that, the ignition timings for cases indicated by the white and black circles in the upper chart of FIG. 6 are set to be the same timing.

By setting the fuel pressure to, for example, 30 MPa or above, the combustion period can effectively be shortened. Moreover, the fuel pressure of 30 MPa or above can effectively shorten the injection period and also the mixture gas forming period. Note that, the fuel pressure may be suitably set according to a type of fuel to be used which at least contains gasoline. The upper limit value of the fuel pressure may be 120 MPa, etc.

The high pressure retarded injection avoids the occurrence of abnormal combustion in the SI mode by devising the mode of the fuel injection into the cylinder 18. Other than such high pressure retarded injection, it has conventionally been known to avoid the abnormal combustion by retarding the ignition timing. The retarded ignition timing suppresses the increases of the temperature and pressure of the unburned mixture gas and, thereby, suppresses the progression of the reaction of the unburned mixture gas. However, while the retarded ignition timing causes degradation of the thermal efficiency and reduction of the torque, when the high pressure retarded injection is performed, since the abnormal combustion is avoided by devising the mode of the fuel injection, the ignition timing can be advanced, and thus, the thermal efficiency can be improved and the torque can be increased. In other words, the high pressure retarded injection can, not only avoid the abnormal combustion, but also enable the ignition timing to be advanced accordingly, and thereby, is advantageous in improving the fuel consumption.

As described above, the high pressure retarded injection in the SI mode can shorten each of the injection period, the mixture gas forming period, and the combustion period, while the high pressure retarded injection performed within the range (3) of the CI mode can shorten the injection period and the mixture gas forming period. In other words, by injecting the fuel at the high fuel pressure into the cylinder 18 to increase the turbulence inside the cylinder 18, the atomized fuel is more finely mixed, and even when the fuel is injected at the late timing near the CTDC, the comparatively homogeneous mixture gas can swiftly be formed.

In the high pressure retarded injection in the CI mode, by injecting the fuel at the late timing near the CTDC within the comparatively high engine load range, substantially homogeneous mixture gas is swiftly formed as described above while preventing pre-ignition in, for example, a compression stroke period. Therefore, after the CTDC, the compression ignition can surely be performed. Further, by performing the compression-ignition combustion in an expansion stroke period where the pressure inside the cylinder 18 decreases due to the motoring, the combustion subsides and excessive increase of the pressure (dP/dt) inside the cylinder 18 due to the compression-ignition combustion can be avoided. Thus, the restriction of NVH is released and, as a result, the range of the CI mode applicable range extends to the high load range side.

Back to the SI mode, as described above, the high pressure retarded injection in the SI mode shortens the reactable time length of the unburned mixture gas by performing the fuel injection in the retard period; however, although the shortening of the reactable time length is advantageous within the low engine speed range where the engine speed is comparatively low because the actual reactable time length against the crank angle change is long, within the high engine speed range where the engine speed is comparatively high, since the actual reactable time length against the crank angle change is short, it is less advantageous. On the other hand, with the retarded injection, since the fuel injection timing is set to near the CTDC, on the compression stroke, the in-cylinder gas that does not include the fuel, in other words, air at high specific heat ratio, is compressed. As a result, within the high engine speed range, the temperature inside the cylinder 18 at the end of the compression stroke increases, and this increased temperature at the end of the compression stroke causes knocking. Therefore, when only performing the retarded injection within the range (5), there may be a case where it is required to retard the ignition timing to avoid knocking.

Therefore, within the range (5) where the engine speed is relatively high in the SI mode as shown in FIG. 4, a part of the fuel for injection is injected into the cylinder 18 in the intake stroke period, and the rest of the fuel for the injection is injected into the cylinder 18 in the retard period, as shown in FIG. 5D. With the intake stroke injection, the specific heat ratio of the in-cylinder gas on the compression stroke (i.e., the mixture gas including the fuel) may be reduced to suppress the in-cylinder temperature at the end of the compression stroke. By decreasing the in-cylinder temperature at the end of the compression stroke as above, knocking can be suppressed and, therefore, the ignition timing can be advanced.

Moreover, by performing the high pressure retarded injection, as described above, the turbulence inside the cylinder 18 (in the combustion chamber 19) near the CTDC becomes strong, and the combustion period becomes shorter. This shorter combustion period is also advantageous in suppressing knocking, and the ignition timing can further be advanced. Thus, within the range (5), by performing the split injection including the intake stroke injection and the high pressure retarded injection, the thermal efficiency can be improved while avoiding the abnormal combustion.

Note that, instead of performing the high pressure retarded injection, a multi-point ignition system may be adopted to shorten the combustion period within the range (5). Specifically, a plurality of ignition plugs is arranged to be oriented toward inside the combustion chamber 19, and within the range (5), the intake stroke injection is performed as well as each of the plurality of ignition plugs is controlled to perform a multi-point ignition. In this case, since a flame spreads from each of the plurality of fire sources inside the combustion chamber 19, the flame spreads rapidly and the combustion period becomes shorter. As a result, the combustion period is shortened similar to when adopting the high pressure retarded injection, and this shortened combustion period is advantageous in improving the thermal efficiency.

The engine 1 performs the operation according to each operating range as described above.

<Deceleration Fuel Cut>

Figure 7:
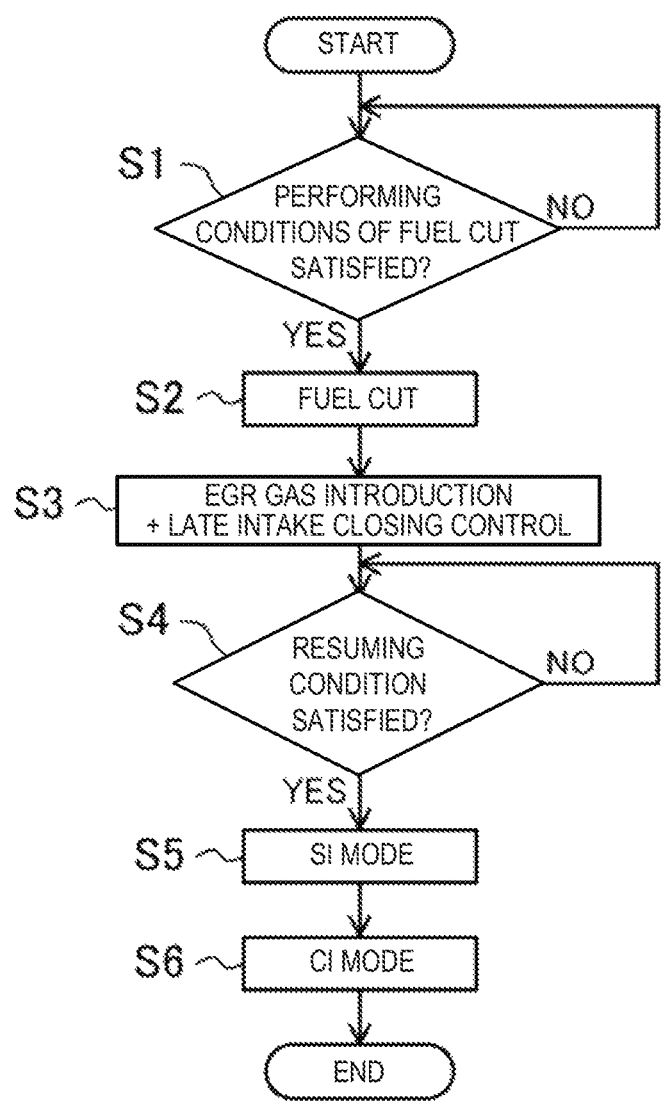
FIG. 7 is a flowchart showing processing of a deceleration fuel cut.

Moreover, the engine 1 is controlled by the PCM 10 to suspend the fuel supply from the injector 67, in other words, to perform a fuel cut, during the deceleration of the vehicle. By this deceleration fuel cut, the fuel consumption can be improved. Hereinafter, the deceleration fuel cut of the engine 1 by the PCM 10 is described in detail with reference to FIGS. 7 to 11. FIG. 7 is a flowchart showing processing of the deceleration fuel cut (hereinafter, may simply be referred to as the "fuel cut"). FIGS. 8 to 11 are views showing states of the respective elements of the engine 1 during the fuel cut control. In each of FIGS. 8 to 11, the part (A) shows a fuel injection timing and a pressure change in the cylinder 18, and shows a spark-ignition timing for when the spark ignition is performed, the part (B) shows the lift of the intake valve 21 (broken line) and the lift of the exhaust valve 22 (solid line), the part (C) shows the opening of the throttle valve 36, and the part (D) shows kinds of the components in the cylinder 18.

Figure 8:
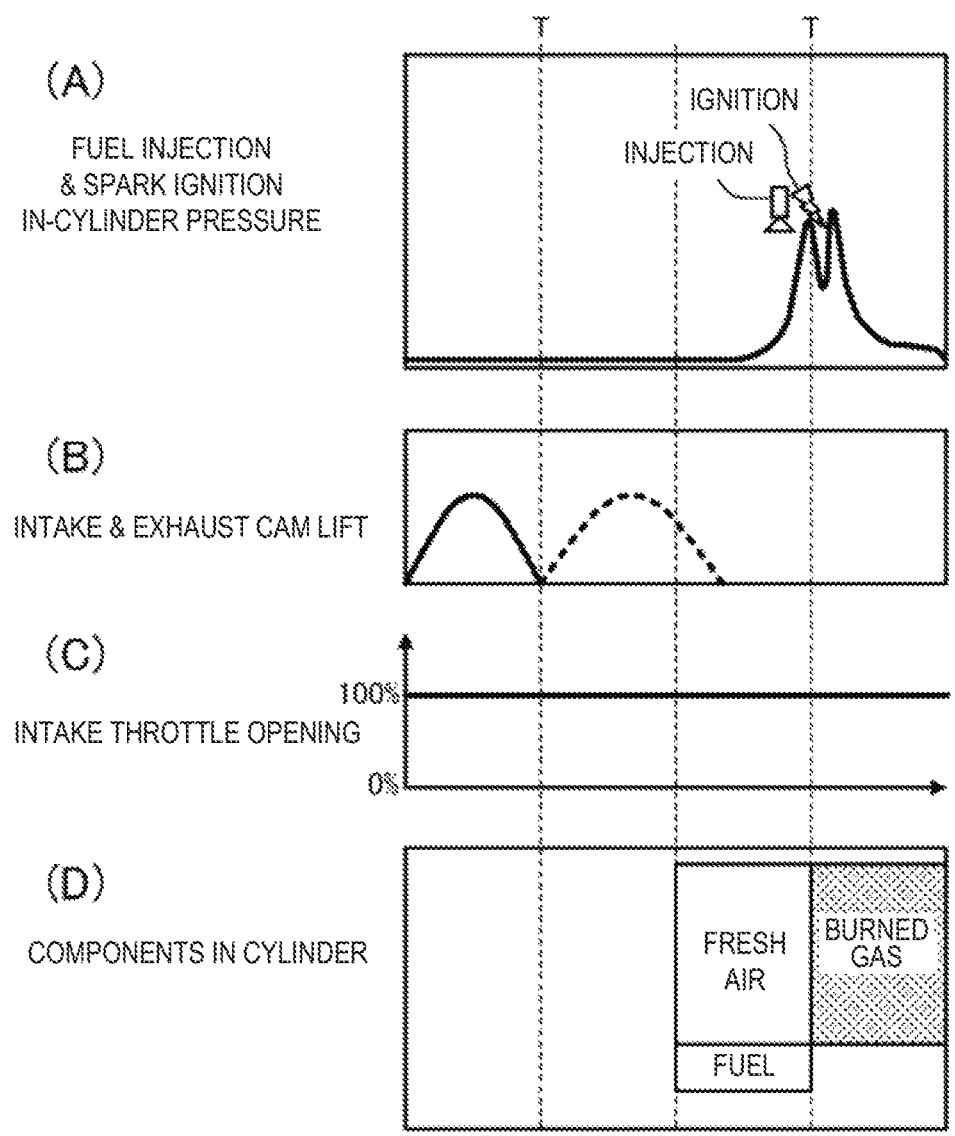
FIG. 8 shows charts illustrating states of respective elements of the engine before the fuel cut, in which the part (A) shows a fuel injection timing and a pressure change in the cylinder and, when the spark ignition is performed, a spark-ignition timing, the part (B) shows a lift of the intake valve (broken line) and a lift of the exhaust valve (solid line), the part (C) shows an opening of the throttle valve, and the part (D) shows kinds of components in the cylinder.

In the following description, a case of performing the fuel cut in the state where the engine 1 is operated in the SI mode within the range (4). Specifically, the engine 1 performs the operation as shown in FIG. 8. In other words, as shown in the part (B) of FIG. 8, the exhaust valve 22 is opened on the exhaust stroke, and the intake valve 21 is opened on the intake stroke. As shown in the part (A) of FIG. 8, the high pressure retarded injection is performed in the late stage of the compression stroke and before the CTDC, and the ignition is performed after the CTDC. Here, the air-fuel ratio of the mixture gas is set to the theoretical air-fuel ratio ($\lambda \approx 1$), and the fresh air amount and the EGR gas amount are adjusted to obtain a fresh air amount suitable for the fuel injection amount. In this case, as shown in the part (C) of FIG. 8, the throttle valve 36 is fully opened. On the other hand, the EGR valve 511 and the EGR cooler bypass valve 531 are fully closed. Therefore, the components inside the cylinder 18 are mostly fresh air before the combustion period, then the fuel is injected thereto, and the components inside the cylinder 18 mostly turns into burned gas after the combustion period.

First, at Step S1, the PCM 10 determines whether performing conditions of the fuel cut are satisfied. Here, the performing conditions are that the engine speed is above a predetermined value (e.g., 1500 rpm), and the accelerator opening is zero (i.e., the accelerator is in a non-operated state). In other words, although the deceleration state of the engine 1 due to the non-operated accelerator state is determined by the accelerator opening becoming zero, when the engines speed is extremely low, the fuel cut is not performed. Note that, these performing conditions are merely an example, and are not limited to the above. When the performing conditions are satisfied, the PCM 10 proceeds to Step S2. When the performing conditions are not satisfied, the PCM 10 repeats the processing of Step S1.

At Step S2, the PCM 10 performs the fuel cut. Specifically, the PCM 10 suspends the fuel injection of the injector 67. Here, the fuel injection of the injector 67 is suspended for all the cylinders. Then, the PCM 10 proceeds to Step S3.

Note that, in the deceleration, the PCM 10 turns the generator 81 into a generating mode to convert a motional energy of the vehicle into an electric energy and collect the energy as a power. Here, as shown in the part (C) of FIG. 9, the PCM 10 fully opens the throttle valve 36. In this manner, the pumping loss can be reduced and the motional energy of the engine 1 can be efficiently converted into the electric energy.

Subsequently, at Step S3, the PCM 10 introduces the EGR gas into the cylinder 18. Specifically, the PCM 10 turns the VVL 71 on and, as shown in the part (B) of FIG. 9, performs the exhaust open-twice control of opening the exhaust valve 22 on the intake stroke. In this manner, the hot EGR gas is introduced into the cylinder 18, and the temperature decrease inside the cylinder 18 is suppressed. Particularly, as described above, when the throttle valve 36 is fully opened to reduce the pumping loss, the introduction amount of fresh air into the cylinder 18 tends to increase; however, by introducing the hot EGR gas, the increase of the introduction amount of fresh air into the cylinder 18 is suppressed and, thus, the temperature decrease inside the cylinder 18 immediately after the fuel cut can be suppressed.

Here, the PCM 10 controls the VVT 72 and the CVVL 73 to perform a late closing control of the intake valve 22 so that the mixture gas blows back to the intake port 16. Specifically, the exhaust valve 22 is opened on the intake stroke, and immediately after the exhaust valve 22 is closed (i.e., immediately after the opening event of the exhaust valve 22 for the second time ends), the intake valve 21 is opened. The open timing of the intake valve 21 corresponds to about when the early half of the intake stroke event has ended. Then, the intake valve 21 is closed on the compression stroke. The close timing of the intake valve 21 corresponds to when an early half of the compression stroke event has ended after passing an intake top dead center (ITDC). As above, the PCM 10 opens the intake valve 21 after opening the exhaust valve 22 on the intake stroke, and closes the intake valve 21 at a timing after closing the exhaust valve 22 and when the mixture gas is blown back to the intake port 16.

Figure 9:
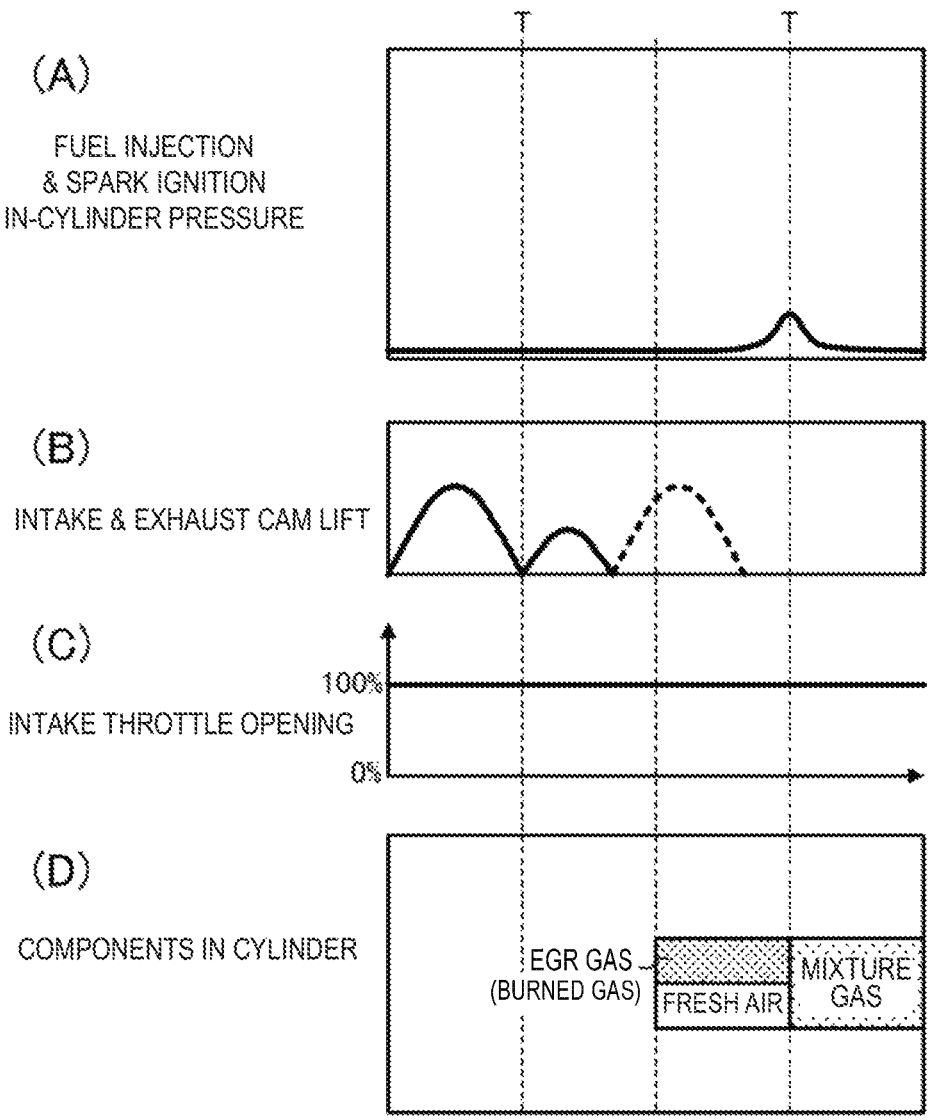
FIG. 9 shows charts illustrating states of respective elements of the engine during the fuel cut, in which the part (A) shows the fuel injection timing and the pressure change in the cylinder and, when the spark-ignition is performed, the spark-ignition timing, the part (B) shows the lift of the intake valve (broken line) and the lift of the exhaust valve (solid line), the part (C) shows the opening of the throttle valve, and the part (D) shows kinds of the components in the cylinder.

Since the trapping volume inside the cylinder 18 is reduced by the late intake closing control, the volume of the mixture gas inside the cylinder 18 is, as shown in the part (D) of FIG. 9, reduced compared to before the fuel cut (see the part (D) of FIG. 8). Therefore, on the following exhaust stroke, the fresh air amount to be discharged to the exhaust port 17 can be reduced. As a result, the temperature decrease of the direct catalyst 41 and the underfoot catalyst 42 during the fuel cut can be suppressed.

Additionally, by the exhaust open-twice control, the EGR gas is included in the mixture gas. Therefore, the temperature of the mixture gas can be increased, and further, the temperature decrease of the cylinder 18, the intake port 16, and the exhaust port 17 can be suppressed. Also by the late intake closing control, the temperature decrease of the direct catalyst 41 and the underfoot catalyst 42 during the fuel cut can be suppressed.

Moreover, by the late intake closing control, a part of the mixture gas including the EGR gas is blown back to the intake port 16. Therefore, the gas introduced into the cylinder 18 from the intake port 16 includes the EGR gas and, thus, has a higher temperature than fresh air alone. Also by the late intake closing control, the temperature decrease of the cylinder 18 can be suppressed.

Moreover, as shown in the part (A) of FIG. 9, since the pressure increase of the cylinder 18 is suppressed by the late intake closing control, the pumping loss can be reduced. The engine 1 includes the deceleration regenerative system 80, and regenerates the motional energy during the fuel cut. In other words, by performing the late intake closing control, a larger amount of energy can be regenerated. Further here, as shown in the part (C) of FIG. 9, the throttle valve 36 is fully opened. Also by the late intake closing control, the pumping loss is reduced and a larger amount of energy can be regenerated.

Subsequently, at Step S4, the PCM 10 determines whether a resuming condition of the fuel injection is satisfied. Here, the resuming condition is that the engine 1 is in a predetermined operating state, specifically, the engine speed is below a predetermined speed (e.g., 800 rpm) which is lower than the engine speed in the performing conditions. This predetermined speed is slightly higher than the idle speed. The operating state satisfying this resuming condition is within the range (1). Note that, this resuming condition is merely an example, and not limited to the above.

Normally, when the fuel cut is performed, the engine load rapidly decreases and the operating state of the engine 1 reaches the range (1). Then, the engine speed gradually decreases. As a result, the engine 1 becomes the predetermined operating state in time (e.g., the engine speed is below the predetermined speed). When the resuming condition is satisfied, the PCM 10 proceeds to Step S5. When the resuming conditions are not satisfied, the PCM 10 repeats the processing of Step S4.

At Step S5, the PCM 10 resumes the fuel injection and the combustion.

Figure 10:
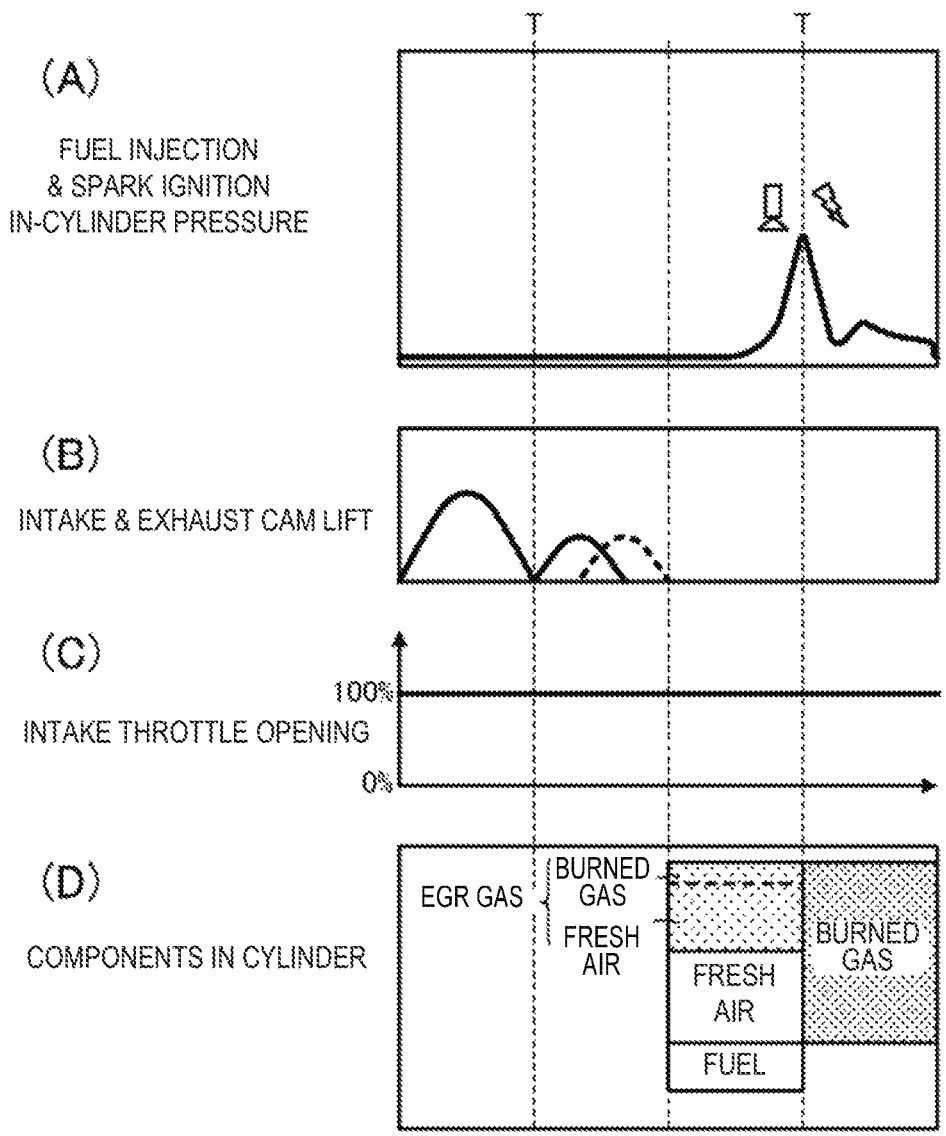
FIG. 10 shows charts illustrating states of respective elements of the engine when resuming the fuel injection, in which the part (A) shows the fuel injection timing and the pressure change in the cylinder and, when the spark-ignition is performed, the spark-ignition timing, the part (B) shows the lift of the intake valve (broken line) and the lift of the exhaust valve (solid line), the part (C) shows the opening of the throttle valve, and the part (D) shows kinds of the components in the cylinder.

Specifically, as shown in the part (A) of FIG. 10, the PCM 10 resumes the combustion in the SI mode. Here, the PCM 10 performs the high pressure retarded injection.

Moreover, the PCM 10 advances the open timing and close timing of the intake valve 21. Specifically the open timing of the intake valve 21 is advanced to slightly before the late half of the stage of the compression stroke. The close timing of the intake valve 21 is advanced to near the ITDC. In this manner, the fresh air amount can be secured for the combustion resuming. Note that, the PCM 10 controls the CVVL 73 to obtain a low lift corresponding to the torque.

Moreover, as shown in the part (B) of FIG. 10, the PCM 10 continues to introduce the EGR gas by the exhaust open-twice control. The air excess ratio of the mixture gas is set to $\lambda \approx 1$. Note that, as shown in the part (C) of FIG. 10, the throttle valve 36 is fully opened. In this embodiment, the SI mode is applied for only one cycle, and the PCM 10 proceeds to Step S6 thereafter.

When resuming the fuel injection, the temperature decrease of the cylinder 18 is suppressed due to the introduction of the hot EGR gas and, as shown in the part (D) of FIG. 10, the ratio of fresh air inside the cylinder 18 is increased due to the continuation of the EGR gas introduction. Therefore, the ignitability in the SI mode can be improved. Specifically, since the combustion is not performed during the fuel cut, even if the EGR gas is recirculated into the cylinder 18, the ratio of the burned gas within the EGR gas gradually reduces. In other words, the ratio of the burned gas inside the cylinder 18 reduces with time and the ratio of fresh air increases. Particularly, when a lockup mechanism of an automatic transmitter is operated, even when the fuel cut is performed, the engine speed will not decrease rapidly, but gradually. Therefore, it is time taking to satisfy the resuming condition after starting the fuel cut, and most of the EGR gas may become fresh air.

When the fuel cut continues for a certain period of time, a certain amount of fresh air is secured in the cylinder 18. Since the increase of fresh air inside the cylinder 18 improves flame propagation, the ignitability in the SI mode improves.

Note that, since the ratio of fresh air inside the cylinder 18 increases when resuming the fuel injection, if the fuel injection is performed in the period from the intake stroke to the middle stage of the compression stroke, there is a possibility of causing the abnormal combustion (e.g., pre-ignition). Thus, the high pressure retarded injection is performed. In this manner, the abnormal combustion can be avoided.

Here, the introduction of the hot EGR gas at Step S3 also continues in the SI mode. In other words, the burned gas after the spark-ignition combustion in the SI mode is recirculated into the cylinder 18 as a hot EGR gas. As a result, the temperature inside the cylinder 18 after the spark-ignition combustion becomes high. Here, the timing of opening the exhaust valve 22 the second time (i.e., on the intake stroke) is earlier than the open timing of the intake valve 21. In this manner, the state where only the exhaust valve 22 is open in the early stage of the intake stroke can be created. Thus, the hot EGR gas can be preferentially sucked into the cylinder 18.

Then, at Step S6, the PCM 10 shifts to the CI mode. Here, as shown in the part (D) of FIG. 11, the burned gas after the spark-ignition combustion performed at the preceding Step S5 is recirculated into the cylinder 18. Therefore, the temperature inside the cylinder 18 is high, and the compression-ignition combustion can be performed. Note that, the intake valve 21 is, as shown in the part (B) of FIG. 11, controlled to have a small lift corresponding to the torque, and the throttle valve 36 is, as shown in the part (C) of FIG. 11, fully opened. Moreover, as shown in the part (B) of FIG. 11, since the exhaust open-twice control continues and the hot EGR gas is introduced into the cylinder 18, a working gas fuel ratio G/F becomes lean. The air excess ratio λ of the mixture gas is set to 2.4:1 or higher, for example.

Figure 11:
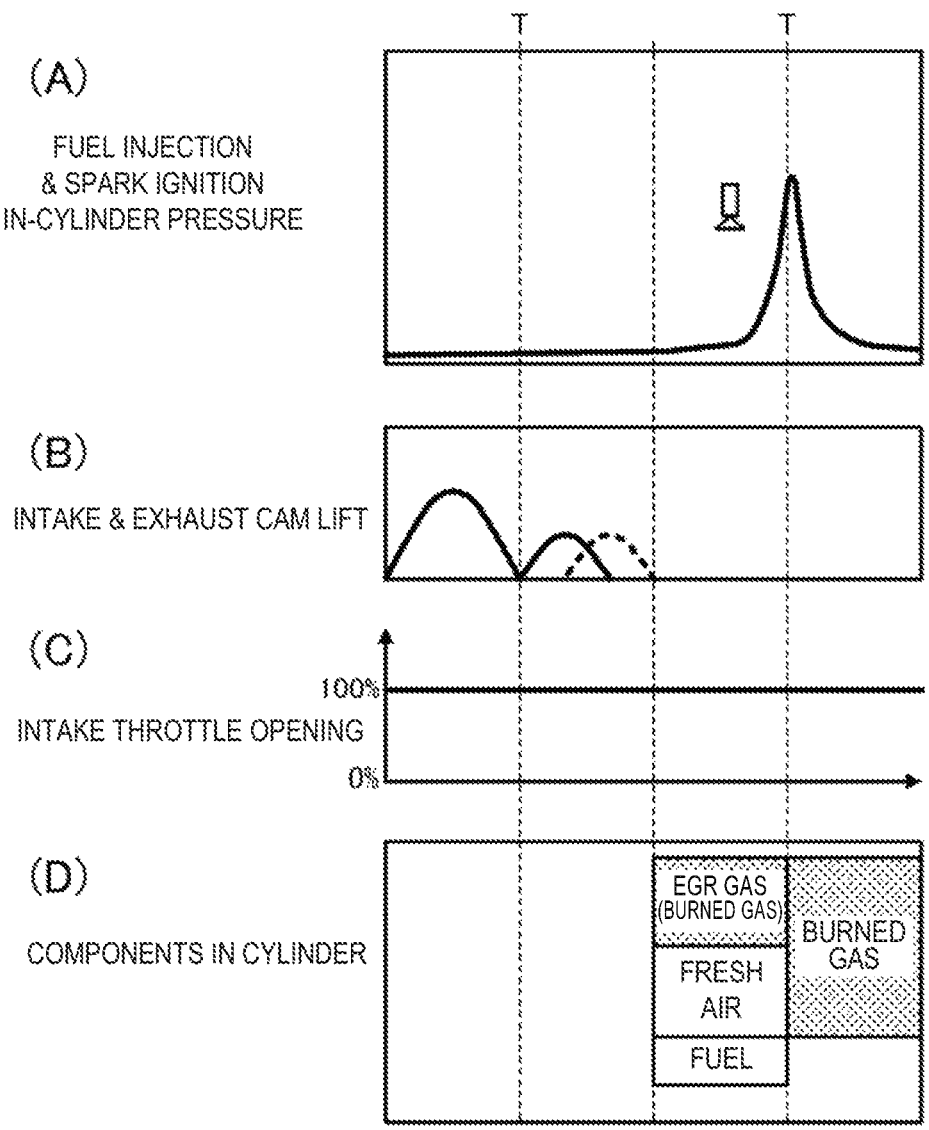
FIG. 11 shows charts illustrating states of respective elements of the engine after shifting to the CI mode, in which the part (A) shows the fuel injection timing and the pressure change in the cylinder and, when the spark-ignition is performed, the spark-ignition timing, the part (B) shows the lift of the intake valve (broken line) and the lift of the exhaust valve (solid line), the part (C) shows the opening of the throttle valve, and the part (D) shows kinds of the components in the cylinder.

Note that, since the temperature inside the cylinder 18 is high, as shown in the part (A) of FIG. 11, the high retarded injection is performed to avoid the abnormal combustion (e.g., pre-ignition). In this manner, the compression-ignition combustion can be stabilized while avoiding the abnormal combustion.

Thus, the fuel cut control ends, and the engine 1 is operated thereafter in the operating mode corresponding to the operating range described above.

Therefore, the engine 1 of this embodiment includes the engine body having the cylinders 18, the intake valves 21 for opening and closing the respective intake ports 16 which open to the cylinders 18, the exhaust valves 22 for opening and closing the respective exhaust ports 17 which open to the cylinders 18, the injectors 67 configured to inject the fuel into the cylinder 18, the direct catalyst 41 and the underfoot catalyst 42 provided in the exhaust passage 40, and the PCM 10 configured to operate the engine body by controlling at least the intake valves 21, the exhaust valves 22, and the injectors 67. At least when the operating state of the engine body is within the predetermined low engine load range, the PCM 10 performs the compression-ignition combustion in which the mixture gas inside the cylinder 18 self-ignites to combust. During deceleration of the engine body in a non-operated accelerator state, the PCM 10 performs the fuel cut by suspending the fuel injection from the injector 67, and when the speed of the engine body drops to a predetermined speed, the PCM 10 resumes the fuel injection from the injector 67. During the fuel cut, the controller opens the intake valve 21 after opening the exhaust valve 22 on the intake stroke, and at a timing after closing the exhaust valve 22 and when the mixture gas is blown back to the intake port, the controller closes the intake valve 21.

According to this configuration, during the fuel cut, the intake valve 21 is opened after the exhaust valve 22 is opened, and the intake valve 21 is closed after the exhaust valve 22 is closed. Therefore, the suction amount of fresh air into the cylinder 18 is reduced, as well as a part of the gas inside the cylinder 18 is blown back to the intake port 16. In this manner, the amount of fresh air trapped in the cylinder 18 can be reduced. Thus, on the following exhaust stroke, the fresh air amount to be discharged to the exhaust port 17 can be reduced, and the amount of fresh air reaching the direct catalyst 41 and the underfoot catalyst 42 can be reduced. As a result, the temperature decrease of the direct catalyst 41 and the underfoot catalyst 42 during the fuel cut can be suppressed.

Additionally, since the exhaust valve 22 is opened on the intake stroke during the fuel cut, the EGR gas is introduced into the cylinder 18. Although the temperature inside the cylinder 18 tends to drop during the fuel cut since the combustion is not performed, by introducing the EGR gas, the temperature decrease inside the cylinder 18 immediately after the fuel cut can be suppressed. As a result, the mixture gas to be discharged to the exhaust port 17 includes the EGR gas and has a higher temperature compared to when only including fresh air. The mixture gas including the EGR gas is also effective in suppressing the temperature decrease of the direct catalyst 41 and the underfoot catalyst 42.

Additionally, since the mixture gas including the EGR gas is blown back to the intake port 16, the gas introduced into the cylinder 18 from the intake port 16 on the intake stroke also includes the EGR gas. This gas has a higher temperature compared to when only including fresh air. The higher-temperature gas is also effective in suppressing the temperature decrease of the direct catalyst 41 and the underfoot catalyst 42.

Moreover, by performing the EGR and the late intake closing control, the temperature decrease inside the cylinder 18 during the fuel cut can be suppressed. Thus, the ignitability for the combustion when resuming the fuel injection can be improved.

Furthermore, the PCM 10 is configured to operate, when the operating state of the engine 1 is within the range (1), the engine 1 by performing the compression-ignition combustion where the mixture gas inside the cylinder combusts by a self-ignition.

The engine load decreases rapidly by performing the fuel cut. Therefore, when resuming the fuel injection from the fuel cut, the operating state of the engine 1 is normally within the range (1). Specifically, when resuming the fuel injection, the operating state of the engine 1 is within the range where the compression-ignition combustion is performed. In view of performing the compression-ignition combustion, the temperature decrease inside the cylinder 18 is undesirable, but performing the EGR and the late intake closing control is advantageous also in view of the compression-ignition combustion.

Moreover, the PCM 10 is configured to set, at least when the operating state of the engine 1 is within the range (4) or (5), the air excess ratio to 1:1 or below to operate the engine 1.

Within the range (4) or (5), since the air excess ratio is 1:1 or below, the combusted gas temperature is increased. Therefore, when performing the fuel cut from the state where the operating state of the engine 1 is within the range (4) or (5), the burned gas at a comparatively high temperature is introduced into the cylinder 18 and the temperature decrease of the direct catalyst 41 and the underfoot catalyst 42 can effectively be suppressed.

The PCM 10 advances the close timing of the intake valve 21 when resuming the fuel injection. Thus, the amount of fresh air for the combustion resuming can be secured.

Moreover, the engine 1 includes the deceleration regenerative system 80 for regenerating the motional energy during deceleration.

According to this configuration, the late intake closing control is performed during the fuel cut. Thus, the pumping loss can be reduced. As a result, a larger amount of energy can be regenerated by the deceleration regenerative system 80. Moreover, in this embodiment, since the throttle valve 36 is fully opened during the fuel cut, also in this regard, the pumping loss can be reduced and a larger amount of energy can be regenerated by the deceleration regenerative system 80.

Other Embodiments

In the above embodiment, the fuel injection from the injector 67 is suspended for all the cylinders at once during the fuel cut; however, it is not limited to this. For example, the fuel injection from the injector 67 may be suspended in a stepwise fashion such that the fuel injection from the injector 67 is suspended for half of the cylinders first, and then for the rest of the cylinders. In this manner, for example, torque shock of the engine 1 during the fuel cut can be subsided.

Further, in the description above, the case where performing the fuel cut starting from the state where the engine 1 is operated within the range (4) is described; however, it is not limited to this. For example, the fuel cut may be performed starting from the state where the engine 1 is operated within the range (3).

In the above embodiment, the engine 1 is operated in the SI mode when resuming the fuel injection, and then shifted to the CI mode; however, it is not limited to this. For example, the engine 1 may be operated in the CI mode when resuming the fuel injection.

Further, even when the engine 1 is operated in the SI mode when resuming the fuel injection, the number of cycles to perform the operation in the SI mode may be set arbitrarily. Specifically, the engine 1 may be operated in the SI mode for a few cycles and then shifted to the CI mode. For example, by observing the temperature inside the cylinder 18, the mode can be shifted to the CI mode when the temperature inside the cylinder 18 reaches a predetermined value by the combustion in the SI mode.

Note that, in the above embodiment, the EGR gas is introduced after performing the fuel cut; however, it is not limited to this. For example, the EGR gas may be introduced first before the fuel cut, or the fuel cut and the EGR gas introduction may be performed simultaneously.

Further, regarding other processing described above, the performing orders may be changed or the other processing may be performed in parallel to each other.

Furthermore, the fuel injection in the intake stroke period may be performed into the intake port 16 by a port injector separately provided in the intake port 16, instead of the injector 67 provided in the cylinder 18.

Moreover, the engine 1 is not limited to the in-line four cylinder engine described above, and may be applied to an in-line three cylinder engine, an in-line two cylinder engine, an in-line six cylinder engine, etc. Further, the engine 1 is applicable to various kinds of engines, such as a V6 engine, a V8 engine, and a flat-four engine.

Further, in the description above, the air-fuel ratio of the mixture gas for the predetermined operating range is set to the theoretical air-fuel ratio ($\lambda \approx 1$); however, the air-fuel ratio of the mixture gas may be set lean. Note that, the setting of the air-fuel ratio to the theoretical air-fuel ratio has an advantage that a three-way catalyst can be used.

The operating ranges shown in FIG. 4 are merely an example, and other various operating ranges may be provided.

Moreover, the high pressure retarded injection may be a split injection as needed. Similarly, the intake stroke injection may also be a split injection as needed. With the split injection, the fuel may be injected on each of the intake stroke and the compression stroke.

As described above, the embodiments are described above as examples of the art disclosed in the present invention; however, the application of the disclosed art is not limited to the above, and the art is applicable to embodiments with, for example, suitable changes, modifications, exchanges, additions, and/or omissions from the above embodiments. Moreover, the components described in the above embodiments may be combined to create a new embodiment. Furthermore, the components described in the accompanying drawings and/or the detailed description include essential components for solving the problems and, additionally, may include components that are not essential for solving the problems so as to illustrate the art. Therefore, these non-essential components should not be defined as essential only because the non-essential components are described in the accompanying drawings and/or the detailed description.

As described above, the art disclosed here is useful for spark-ignition direct injection engines.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE NUMERALS

1 Engine (Engine Body)
10 PCM (Controller)
16 Intake Port
17 Exhaust Port
18 Cylinder
21 Intake valve
22 Exhaust valve
40 Exhaust Passage
41 Direct Catalyst (Catalyst)
42 Underfoot Catalyst (Catalyst)
67 Injector (Fuel Injection Valve)
80 Deceleration Regenerative System

The invention claimed is:
1. A spark-ignition direct injection engine, comprising:
an engine body having a cylinder;
an intake valve for opening and closing an intake port that opens to the cylinder;
an exhaust valve for opening and closing an exhaust port that opens to the cylinder;
a fuel injection valve for injecting fuel into the cylinder;
a catalyst provided in an exhaust passage; and
a controller for operating the engine body by controlling at least the intake and exhaust valves and the fuel injection valve,
wherein the controller performs a fuel cut by suspending the fuel injection from the fuel injection valve during deceleration of the engine body in a non-operated accelerator state, and when the speed of the engine body drops to a predetermined speed, the controller resumes the fuel injection from the fuel injection valve,
wherein during the fuel cut, the controller opens the exhaust valve on intake stroke and then opens the intake valve, and at a timing after closing the exhaust valve and when mixture gas is blown back to the intake port, the controller closes the intake valve, and wherein during the fuel cut, the controller performs an exhaust open-twice control that opens the exhaust valve on both an exhaust stroke and the intake stroke in a given engine cycle before opening the intake valve on the intake stroke in the given engine cycle.

2. The engine of claim 1, wherein at least when an operating state of the engine body is within a predetermined low engine load range, the controller operates the engine body by performing a compression-ignition combustion where the mixture gas inside the cylinder combusts by a self-ignition.

3. The engine of claim 1, wherein at least when an operating state of the engine body is within a predetermined high engine load range, the controller sets an air excess ratio to 1:1 or below to operate the engine body.

4. The engine of claim 1, wherein the controller advances a close timing of the intake valve when resuming the fuel injection.

5. The engine of claim 1, further comprising a deceleration regenerative system for regenerating a motional energy during deceleration.

6. The engine of claim 2, further comprising a deceleration regenerative system for regenerating a motional energy during deceleration.

7. The engine of claim 3, further comprising a deceleration regenerative system for regenerating a motional energy during deceleration.

8. The engine of claim 4, further comprising a deceleration regenerative system for regenerating a motional energy during deceleration.

9. A spark-ignition direct injection engine, comprising:
an engine body having a cylinder;
an intake valve for opening and closing an intake port that opens to the cylinder;
an exhaust valve for opening and closing an exhaust port that opens to the cylinder;
a fuel injection valve for injecting fuel into the cylinder;
a catalyst provided in an exhaust passage; and
a controller for operating the engine body by controlling at least the intake and exhaust valves and the fuel injection valve,
wherein the controller performs a fuel cut by suspending the fuel injection from the fuel injection valve during deceleration of the engine body in a non-operated accelerator state, and when the speed of the engine body drops to a predetermined speed, the controller resumes the fuel injection from the fuel injection valve,
wherein during the fuel cut, the controller opens the exhaust valve on intake stroke and then opens the intake valve, and at a timing after closing the exhaust valve and when mixture gas is blown back to the intake port, the controller closes the intake valve,
wherein during the fuel cut, the controller performs an exhaust open-twice control that opens the exhaust valve on both an exhaust stroke and the intake stroke in a given engine cycle before opening the intake valve on the intake stroke in the given engine cycle, and
wherein the controller closes the intake valve on a compression stroke.

10. A spark-ignition direct injection engine, comprising:
an engine body having a cylinder;
an intake valve for opening and closing an intake port that opens to the cylinder;
an exhaust valve for opening and closing an exhaust port that opens to the cylinder;
a fuel injection valve for injecting fuel into the cylinder;
a catalyst provided in an exhaust passage; and
a controller for operating the engine body by controlling at least the intake and exhaust valves and the fuel injection valve,
wherein the controller performs a fuel cut by suspending the fuel injection from the fuel injection valve during deceleration of the engine body in a non-operated accelerator state, and when the speed of the engine body drops to a predetermined speed, the controller resumes the fuel injection from the fuel injection valve,
wherein during the fuel cut, the controller opens the exhaust valve on intake stroke and then opens the intake valve, and at a timing after closing the exhaust valve and when mixture gas is blown back to the intake port, the controller closes the intake valve,
wherein during the fuel cut, the controller performs an exhaust open-twice control that opens the exhaust valve on both an exhaust stroke and the intake stroke in a given engine cycle before opening the intake valve on the intake stroke in the given engine cycle,
wherein the controller closes the intake valve on a compression stroke, and
wherein during the fuel cut on the intake stroke, the controller opens the intake valve after closing the exhaust valve.

11. The engine of claim 1, wherein during the fuel cut, peak lift of the intake valve is configured to be retarded relative to intake bottom dead center.

12. The engine of claim 9, wherein during the fuel cut, peak lift of the intake valve is configured to be retarded relative to intake bottom dead center.

13. The engine of claim 10, wherein during the fuel cut, peak lift of the intake valve is configured to be retarded relative to intake bottom dead center.

* * * * *